United States Patent
Duffey et al.

(10) Patent No.: US 8,125,095 B2
(45) Date of Patent: Feb. 28, 2012

(54) VARIABLE SPEED SYNCHRONOUS GENERATOR

(76) Inventors: Christopher K. Duffey, Clackamas, OR (US); Leslie R. Smith, Oregon City, OR (US)

( * ) Notice: Subject to any disclaimer, the term of this patent is extended or adjusted under 35 U.S.C. 154(b) by 432 days.

(21) Appl. No.: 12/487,643

(22) Filed: Jun. 18, 2009

(65) Prior Publication Data

US 2009/0315329 A1 Dec. 24, 2009

Related U.S. Application Data

(60) Provisional application No. 61/073,699, filed on Jun. 18, 2008.

(51) Int. Cl.
*F03D 9/00* (2006.01)
*H02P 9/04* (2006.01)
*F02D 29/06* (2006.01)
*F02B 63/04* (2006.01)
*H02K 7/18* (2006.01)

(52) U.S. Cl. ............ 290/44; 290/1 A; 290/40 C; 290/55

(58) Field of Classification Search .................. 290/1 A, 290/40 C, 44, 55
See application file for complete search history.

(56) References Cited

U.S. PATENT DOCUMENTS 3,308,318 A * 3/1967 Dunaiski et al. .............. 310/114
(Continued)

FOREIGN PATENT DOCUMENTS

JP 09-065623 A 3/1997
(Continued)

OTHER PUBLICATIONS

Patent Cooperation Treaty, Preliminary Report on Patentability and Written Opinion for PCT/US2009/047866, dated Dec. 29, 2010.

(Continued)

*Primary Examiner* — Pedro J Cuevas
(74) *Attorney, Agent, or Firm* — Bryan Cave LLP

(57) ABSTRACT

An input shaft rotates at variable rotation rates and is driven by a variable speed source of energy or power such as by the propeller of a wind-driven electrical generator. The input shaft is connected to a first rotor which electromagnetically interacts with a second rotor to create a torque to cause the second rotor to rotate. The interaction of the first rotor and the second rotor may be varied electrically to vary the torque and in turn the rotation rate of the second rotor. The second rotor interacts with a stator to produce AC electrical power. The rotation rate of the second rotor is controlled so that the generator supplies AC power at an essentially constant frequency.

20 Claims, 11 Drawing Sheets

U.S. PATENT DOCUMENTS

| | | | | |
|---|---|---|---|---|
| 3,973,137 | A * | 8/1976 | Drobina | 310/114 |
| 4,239,977 | A * | 12/1980 | Strutman | 290/44 |
| 4,565,929 | A | 1/1986 | Baskin et al. | 290/44 |
| 4,695,736 | A * | 9/1987 | Doman et al. | 290/44 |
| 5,083,039 | A * | 1/1992 | Richardson et al. | 290/44 |
| 5,225,712 | A * | 7/1993 | Erdman | 290/44 |
| 5,783,893 | A * | 7/1998 | Dade et al. | 310/266 |
| 6,373,160 | B1 * | 4/2002 | Schrodl | 310/114 |
| 6,590,312 | B1 * | 7/2003 | Seguchi et al. | 310/266 |
| 6,794,781 | B2 * | 9/2004 | Razzell et al. | 310/114 |
| 6,815,857 | B2 * | 11/2004 | Akatsu | 310/114 |
| 6,848,165 | B1 * | 2/2005 | Furuse | 29/596 |
| 6,867,560 | B2 * | 3/2005 | Arimitsu | 318/144 |
| 6,954,004 | B2 * | 10/2005 | Skeist et al. | 290/44 |
| 6,969,922 | B2 | 11/2005 | Welches et al. | 290/1 A |
| 6,984,897 | B2 * | 1/2006 | Skeist et al. | 290/44 |
| 7,030,528 | B2 * | 4/2006 | Morgante | 310/112 |
| 7,071,579 | B2 * | 7/2006 | Erdman et al. | 290/55 |
| 7,294,947 | B2 | 11/2007 | Corbin et al. | 310/103 |
| 7,325,637 | B2 * | 2/2008 | Sadarangani | 180/65.31 |
| 7,348,684 | B2 | 3/2008 | Franke | 290/40 C |
| 7,352,075 | B2 * | 4/2008 | Willey et al. | 290/44 |
| 7,362,001 | B2 | 4/2008 | Kusumi | 290/31 |
| 7,402,916 | B2 | 7/2008 | Taspinar et al. | 290/22 |
| 7,466,053 | B1 * | 12/2008 | Radev | 310/114 |
| 7,521,835 | B2 * | 4/2009 | Qu et al. | 310/184 |
| 7,750,521 | B2 * | 7/2010 | Qu et al. | 310/112 |
| 7,763,989 | B2 * | 7/2010 | Kinzie et al. | 290/44 |
| 7,786,608 | B2 * | 8/2010 | Menke | 290/44 |
| 7,808,149 | B2 * | 10/2010 | Pabst et al. | 310/216.086 |
| 7,851,933 | B2 * | 12/2010 | Duffey et al. | 290/44 |
| 7,884,518 | B2 * | 2/2011 | Blessing et al. | 310/114 |
| 7,902,689 | B2 * | 3/2011 | Kinzie et al. | 290/55 |
| 7,945,350 | B2 * | 5/2011 | Kinzie et al. | 700/280 |
| 7,948,100 | B2 * | 5/2011 | Nies et al. | 290/44 |
| 7,982,326 | B2 * | 7/2011 | Tan et al. | 290/44 |
| 8,013,460 | B2 * | 9/2011 | Kinzie et al. | 290/44 |
| 8,030,791 | B2 * | 10/2011 | Lang et al. | 290/44 |
| 8,035,240 | B2 * | 10/2011 | Erdman et al. | 290/44 |
| 2003/0006614 | A1 * | 1/2003 | Appa | 290/55 |
| 2004/0026929 | A1 | 2/2004 | Rebsdorf et al. | 290/44 |
| 2004/0155554 | A1 * | 8/2004 | Morgante | 310/266 |
| 2004/0217594 | A1 | 11/2004 | Feddersen et al. | 290/44 |
| 2004/0217595 | A1 | 11/2004 | Feddersen et al. | 290/44 |
| 2004/0217596 | A1 | 11/2004 | Feddersen et al. | 290/44 |
| 2004/0222642 | A1 | 11/2004 | Siebenthaler et al. | 290/44 |
| 2006/0261765 | A1 | 11/2006 | Prasanna | 318/400.01 |
| 2006/0264296 | A1 * | 11/2006 | Moeller | 475/275 |
| 2007/0007835 | A1 | 1/2007 | Wise | 310/80 |
| 2007/0205602 | A1 * | 9/2007 | Willey et al. | 290/44 |
| 2007/0290563 | A1 | 12/2007 | Zhao et al. | 310/114 |
| 2008/0026902 | A1 | 1/2008 | Willie | 475/331 |
| 2008/0150282 | A1 | 6/2008 | Rebsdorf et al. | 290/44 |
| 2008/0223684 | A1 * | 9/2008 | Duffey et al. | 192/105 R |
| 2009/0008938 | A1 * | 1/2009 | Erdman et al. | 290/44 |
| 2009/0085354 | A1 * | 4/2009 | Tan et al. | 290/44 |
| 2009/0126369 | A1 * | 5/2009 | Walitzki et al. | 60/787 |
| 2009/0140591 | A1 * | 6/2009 | Blessing et al. | 310/156.37 |
| 2009/0160187 | A1 * | 6/2009 | Scholte-Wassink | 290/44 |
| 2009/0162202 | A1 * | 6/2009 | Nies et al. | 416/147 |
| 2009/0206607 | A1 * | 8/2009 | Nakamura et al. | 290/44 |
| 2009/0224607 | A1 | 9/2009 | Kjaer et al. | 307/82 |
| 2009/0322086 | A1 * | 12/2009 | Letas | 290/44 |
| 2010/0025995 | A1 * | 2/2010 | Lang et al. | 290/44 |
| 2010/0109328 | A1 * | 5/2010 | Li et al. | 290/44 |
| 2010/0133817 | A1 * | 6/2010 | Kinzie et al. | 290/44 |
| 2010/0133818 | A1 * | 6/2010 | Kinzie et al. | 290/44 |
| 2010/0133819 | A1 * | 6/2010 | Kinzie et al. | 290/44 |
| 2010/0283247 | A1 * | 11/2010 | Krueger | 290/44 |
| 2010/0327584 | A1 * | 12/2010 | Fortmann | 290/44 |
| 2011/0006527 | A1 * | 1/2011 | Kinzie et al. | 290/44 |
| 2011/0018281 | A1 * | 1/2011 | Tan et al. | 290/55 |

FOREIGN PATENT DOCUMENTS

| | | |
|---|---|---|
| JP | 2007-185003 A | 7/2007 |
| WO | 00-31857 A1 | 6/2000 |

OTHER PUBLICATIONS

Patent Cooperation Treaty, International Search Report for PCT/US08/057123, mailed Jul. 25, 2008.

Patent Cooperation Treaty, Written Opinion of the International Searching Authority for PCT/US08/057123, mailed Jul. 25, 2008.

Sigrid M. Bolik, Modelling and Analysis of Variable Speed Wind Turbines with Induction Generator during Grid Fault, book, Institute of Energy Technology Aalborg University, Denmark, Oct. 2004, General background, Chapters 7, 8 and 9; pp. 97-156.

International Search Report for PCT/US09/047866, mailed Feb. 9, 2010.

Written Opinion of the International Searching Authority for PCT/US09/047866, mailed Feb. 9, 2010.

* cited by examiner

VARIABLE SPEED SYNCHRONOUS GENERATOR

PRIORITY CLAIM

This application claims priority from and the benefit of U.S. Provisional Patent Application No. 61/073,699 filed on Jun. 18, 2008, which is incorporated in its entirety by this reference for all purposes.

FIELD

This application relates to systems that transfer or convert power or energy delivered by a prime mover into useful energy and, more particularly, to systems which receive power or energy from a source that delivers power through a shaft that rotates at variable rates and generates an electrical output at a frequency that is essentially or substantially constant. More specifically, this application relates to systems that convert energy from a prime mover like a propeller driven by wind, a water turbine, or a tidal water turbine, into AC power.

BACKGROUND OF THE INVENTION

Wind turbines (e.g., GE Energy 1.5 mw series wind turbine found at http://www.gepower.com), water turbines, and wave turbines (e.g., Islay Wave Power Station in Scotland, UK) have been developed for, among other things, generating electrical power. However, because the wind speed is variable, because tidal and wave characteristics such as height and flow rate vary with many factors including time of day, seasons, weather variations and lunar cycles, the electrical power produced by generators powered by such (hereinafter called "environmentally powered generators") is typically produced at electrical frequencies which vary widely and somewhat randomly with related natural phenomenon. Because power generation (into the power distribution grid) and power obtained by users receiving power from such a generator or the grid needs to be at or very close to a selected and stable frequency, like 60 Hertz (Hz) in the United States, the power from the environmentally powered generators must be converted to the desired or selected stable frequency by suitable frequency conversion devices (e.g., the 1.5 mw series GE wind turbines are reported to be connected to a pulse width modulated IGBT frequency converter). Devices for converting input power at variable frequency to output power at a stable frequency are believed to be inefficient. As a result, it is believed that much useful power or electrical energy generated by environmentally powered generators is lost or wasted. Inasmuch as the amount of electrical power supplied to the various power grids across the United States by environmentally powered generators is increasing, it can be seen that useful power is being wasted in connection with conversion to power grid frequencies.

Typical induction machines, like a motor or a generator, have a rotating element and a stationary element. These are sometimes called a rotor and a stator respectively. In a generator, mechanical power is supplied by a prime mover to rotate an input shaft to rotate the rotating element within the stationary element to obtain electrical power from the stationary element or stator. In a typical induction motor, the power is supplied to the stator to induce the rotor to rotate. In both, well-known principles of electromagnetism are involved with interacting magnet fields producing a torque between the two elements of such machines. Typical induction generators available today are configured to generate 60 Hz power. The prime mover is typically arranged or selected to provide a variable torque or power but at substantially fixed rotation rate.

Systems receiving variable speed input that produce constant frequency electrical output are not known. Indeed, systems for efficiently supplying electrical energy at a constant frequency using energy or torque delivered by a shaft powered by any prime mover that supplies power at a rotation rate that varies are not known.

SUMMARY

A system for supplying electrical energy at a substantially constant frequency receives power from a prime mover that supplies energy or power through a shaft that rotates at variable rotation rates. The system is referred to as a Variable Speed Synchronous Generator or VSSG. The system at hand has three elements that are comparable to the two elements (a single rotor and a single stator), but different because it includes two rotors instead of one. The three elements are mechanically, electrically and magnetically configured to interact to generate electrical energy, i.e., a generator. The VSSG includes a first rotor for transferring torque of the prime mover or a driving shaft at a variable rotation rate to a second rotor that acts as a generator rotor. The second rotor then rotates within a stator so as to produce electrical energy at a substantially constant frequency in the same method that a synchronous generator would. The input shaft may be connected directly to a prime mover, or may be connected to a prime mover through a gearbox to achieve a desired speed for operation of the VSSG.

The VSSG includes a first rotor connected to a prime mover shaft and set within a second rotor. The second rotor is set within a stator. The first rotor is configured to be the first of three elements of an electrical machine that rotates. The second rotor is configured to be the second of the three elements of an electrical machine that rotates; the stator is configured to be the third of three elements of an electrical machine that is stationary. The first rotor and the second rotor rotate independently from each other but are electromagnetically coupled. The second rotor rotates within the stationary stator. That is, as the first rotor rotates, the second rotor is urged to rotate with and in the same direction as the first rotor, but at a different rotation rate as the second rotor rotates within the stationary stator.

In an embodiment of the present invention, the VSSG operates to regulate the frequency and power output by regulating a torque developed across a first air-gap between the first and second rotors. The first torque transferred across the first air-gap between the first rotor and the second rotor urges the second rotor to rotate relative to the first rotor. As the second rotor rotates relative to the stator the generator produces alternating electrical power. More specifically, a first torque at a given rotation rate is applied to an input shaft of the first rotor and a first DC field current is supplied to a plurality of first rotor pole, or field, windings. The first DC field current is used to regulate the second rotor's rotational speed and the first torque transferred from the first rotor to the second rotor. Increasing the first DC field current increases the magnetic field of the rotor and in turn the first torque transferred between the first rotor and or to the second rotor. A second DC field current is supplied to a plurality of second rotor field windings and the second DC field current is used similar to a standard synchronous generator to produce and regulate voltage on the stator windings. Thus, the rotation of the second rotor within the stator generates an alternating current on the output of the stator windings.

As current is drawn from the stator windings of a generator, a second torque appears between the second rotor and the stator. The second torque is then reflected across the first air-gap to the shaft of the first rotor and creates a load on the prime mover connected to the input shaft of the first rotor. Thus, a source of mechanical power is converted to electrical power. As is well known, Power in watts is the product of the mathematical multiplication of voltage and current.

In embodiments of the invention, one or more torque sensors are positioned and configured to sense the first torque transferred from the first rotor to the second rotor. The torque sensors generate and supply a torque level signal reflective of the torque and, therefore, the energy transfer, from the first rotor to the second rotor.

In embodiments of the invention, one or more speed sensors are positioned and configured to sense a rotational speed, e.g., revolutions per minute (RPM), of the second rotor. The speed sensors generate and supply a speed level signal reflective of the rotational speed of the second rotor.

In embodiments of the invention, a torque controller is optionally connected to the torque sensor(s) to receive the torque level signal and generates a torque control signal or torque varying signal responsive to the torque level signal. The torque controller is configured to regulate a torque across the first air gap between the first rotor and the second rotor according to methods developed for a particular prime mover. For example, the torque control signal optionally is received by a DC field controller that connects to and controls either or both of the first and second DC field current. For example, the DC field controller can be configured to adjust, i.e., increase or decrease the first DC field current, thereby causing the first torque to increase or decrease in response to the torque control signal. Once the VSSG is connected to an electrical grid, the torque controller typically adjusts, e.g., increases or decreases, the torque transferred across the first air gap and, thereby, adjusts the load transferred from the prime mover through the first shaft while the AC power drawn at the stator is at or substantially at the frequency of the electrical grid.

In embodiments of the invention, a speed controller is optionally connected to the speed sensor to receive the speed level signal. The speed controller compares the second rotor rotation rate with a preselected, constant, or desired rotation rate and generates a speed control signal or a torque varying signal to cause, for example, the DC field controller to vary the first DC field current and, thereby the first torque to urge the second rotor to rotate at the preselected or desired rotation rate. The desired rotation rate can be such that the rotation rate of the second rotor is selected to generate power out of the stator windings at a constant frequency, such as 60 HZ.

In embodiments of the invention, the VSSG operates to regulate the frequency of the generated voltage by regulating the second DC field current supplied to the second rotor. This is typically accomplished by incorporating a DC field excitation system. A DC field excitation system control has a stator voltage sensor, a DC field controller, and a DC field adjuster. The stator voltage sensor senses and transmits a stator voltage level signal reflective of the stator voltage to the second DC field controller which is, for example, an automatic voltage regulator (AVR). The second DC field controller compares the stator voltage level signal against a desired voltage set-point and generates a compared DC stator voltage signal reflective of the difference between the stator voltage level signal and the voltage set-point. Control circuits in the second DC field controller supply the compared DC stator voltage signal to the DC field adjuster, thereby causing the DC field adjuster to adjust, e.g., increase or decrease, the second DC field current in an amount reflective of the compared DC stator voltage signal. These components typically operate together to keep the stator voltage of the VSSG at either a desired voltage (in stand-alone mode) or a voltage near the grid voltage prior to connecting the VSSG to the grid.

In embodiments of the invention, a common application would be to have a wind turbine prime mover connected to the input shaft that is connected to the first rotor. Upon rotation of the turbine blades by wind and the input shaft connected thereto, the first DC field current is regulated to control the speed of the second rotor so that a frequency is generated on the stator near the grid frequency. Likewise, the second DC field current is regulated to control the stator voltage magnitude so that it also is near the grid voltage magnitude. When both the stator voltage magnitude and frequency are within an acceptable tolerance, the electrical output at the stator of the VSSG is synchronized with and connected to the grid. To increase power transmitted into the grid, the first DC field current is increased which subsequently increases the first torque transferred across the first air gap between the first rotor and the second rotor and, thereby, increasing the load on the prime mover, which, in this instance, is the input shaft and the turbine blades.

In preferred arrangements, the first rotor is circular in cross section and sized to fit within a cylindrical space. The second rotor also is formed to be circular in cross section with an internal surface defining a cylindrical space. The cylindrical space is sized to receive the first rotor therein. The first rotor has an external surface, and the second rotor has an internal surface. A first DC field current is supplied to the first rotor so that upon rotation of the first rotor a torque is generated to urge the second rotor to rotate. Likewise, a second DC field current is supplied to the second rotor so that an AC voltage is generated across the stator windings.

In a more preferred embodiment, the prime mover is a propeller, typically part of a wind turbine configured in a horizontal or vertical axis and propelled by the wind. Alternately, other prime moves such as hydropower turbines, river and ocean current turbines, wave turbines, and the like also fall within the scope of the disclosure. In alternative embodiments, the prime mover is powered by waves that compress air in a chamber and supply it to a propeller. In such systems, the prime mover rotates a shaft to supply power to the VSSG. The VSSG is configured to generate electrical power as a synchronous generator at a preselected and substantially constant frequency.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Various embodiments of the present inventions are set forth in the attached figures and in the Detailed Description as provided herein and as embodied by the claims. It should be understood, however, that this Summary does not contain all of the aspects and embodiments of the one or more present inventions, is not meant to be limiting or restrictive in any manner, and that the invention(s) as disclosed herein is/are and will be understood by those of ordinary skill in the art to encompass obvious improvements and modifications thereto.

Additional advantages of the present invention will become readily apparent from the following discussion, particularly when taken together with the accompanying drawings.

BRIEF DESCRIPTION OF THE DRAWINGS

To further clarify the above and other advantages and features of the one or more present inventions, reference to specific embodiments thereof are illustrated in the appended drawings. The drawings depict only typical embodiments and are therefore not to be considered limiting. One or more embodiments will be described and explained with additional specificity and detail through the use of the accompanying drawings in which.

The drawings are not necessarily to scale.

DETAILED DESCRIPTION

Figure 1:
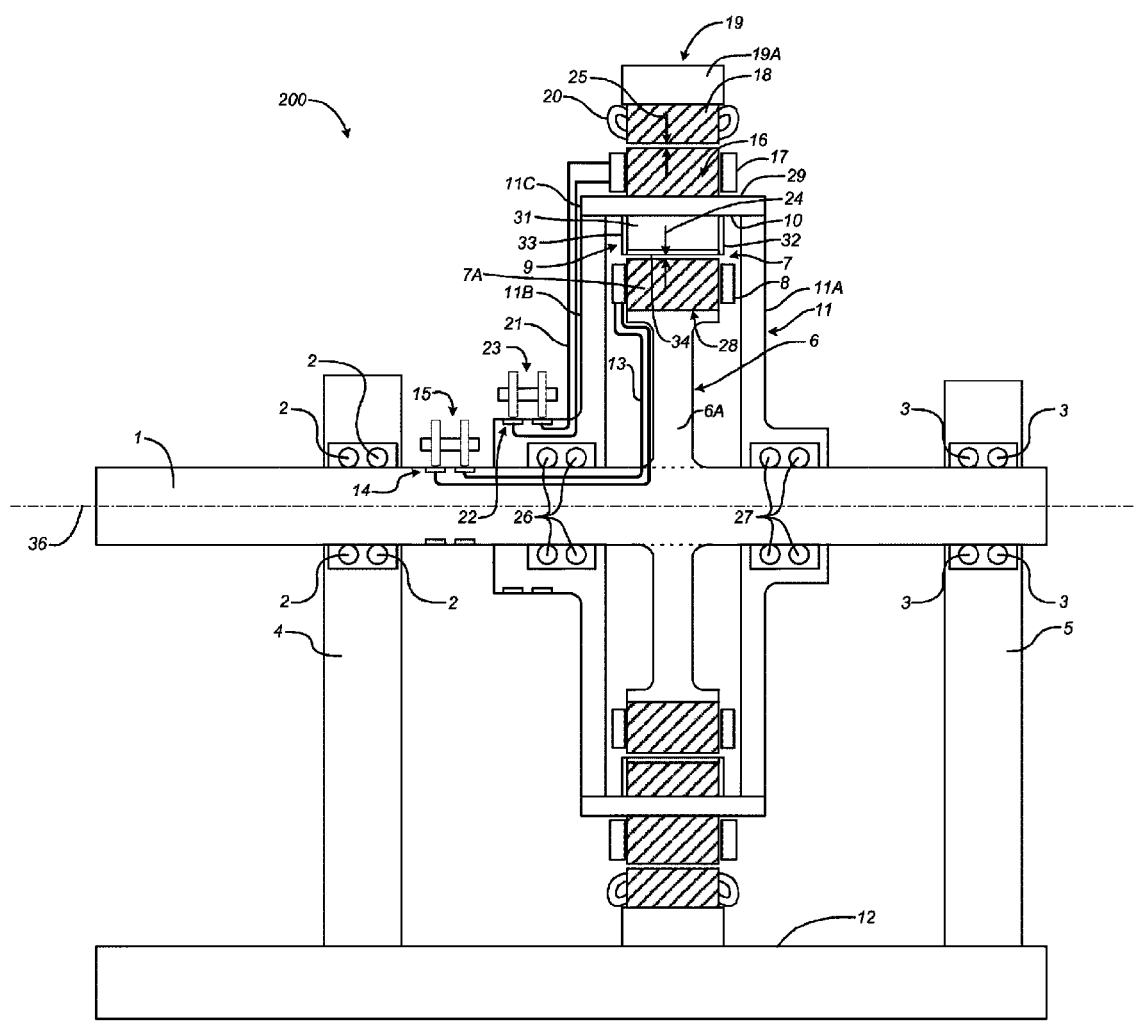
FIG. 1 is a cross-sectional view of an embodiment of the present invention.

An embodiment of a Variable Speed Synchronous Generator (VSSG) 200 is illustrated in FIG. 1. A prime mover may be a shaft extending from suitable gearing that receives rotational power from a propeller. The prime mover can be other devices configured to develop rotational torque. The prime mover supplies its power as a rotational torque delivered by input shaft 1. As previously discussed, non-limiting examples of prime movers suitable and falling within the scope of the disclosure include propellers turned by blowing wind, flowing water, such as in rivers, waves, ocean currents, and the like. In one embodiment, the input shaft 1 is connected directly to a wind turbine blade through a suitable gear box.

The input shaft 1 is typically supported by one or more first input shaft bearing(s) 2 and one or more second input shaft bearing(s) 3 that, in turn, are supported by first input shaft support 4 and second input shaft support 5, respectively. While the shaft bearings 2 and 3 are depicted as a race of ball bearings, other forms of bearings may be used as desired. It is understood that additional bearings and supports like input shaft bearings 2, 3 and input shaft supports 4, 5 fall within the scope of the disclosure.

Optionally, the first input shaft support 4 and second input support shaft support 5 are configured to be positioned on and supported by a support base 12, which optionally is one, two, or more elements or pieces. The first input shaft bearing(s) 2, second input shaft bearing(s) 3, first input shaft support 4, second input shaft support 5, and support base 12 comprise a simplified method for supporting the input shaft 1 for illustration. In actual fabrications of the VSSG the input shaft 1 may be supported by bearings that are part of an enclosure surrounding the entire VSSG or other variations within the knowledge of one having skill in the art.

Connected to the input shaft 1 is a first rotor 6, which typically includes a first rotor support 6A that is typically magnetic or has a magnetic layer attached thereto; a plurality of first rotor poles 7 that are typically, although not necessarily, iron; and a plurality of first rotor pole windings 8, typically copper, aluminum, or other metal insulated wire wrapped or coiled concentrically around each of the plurality of first rotor poles 7. It should be noted and understood that in FIG. 1 element lines are included in the top half of the embodiment VSSG 200, but it is understood that as most elements, subsystems, and the like of the embodiment VSSG 200 are identical in the lower half of the illustration the element lines were excluded for clarity.

In one embodiment, the first rotor support 6A optionally is built as an integral part of the input shaft 1. Alternatively, the first rotor support 6A is a separate component and connected to the input shaft 1, such as by bolts, flanges, interference fits, interlocking teeth, and other methods known in the art. Indeed, any structure to effect a mechanical connection of the rotor support 6A to the shaft may be used as desired.

In one embodiment, the plurality of first rotor poles 7 are composed of iron pole 7A and, more preferably, a number of iron laminations with first rotor pole windings (typically copper wire) 8 wound thereabout. Alternate designs comprising any type of magnetic material and design configuration known in the art fall within the scope of the disclosure.

Figure 4:
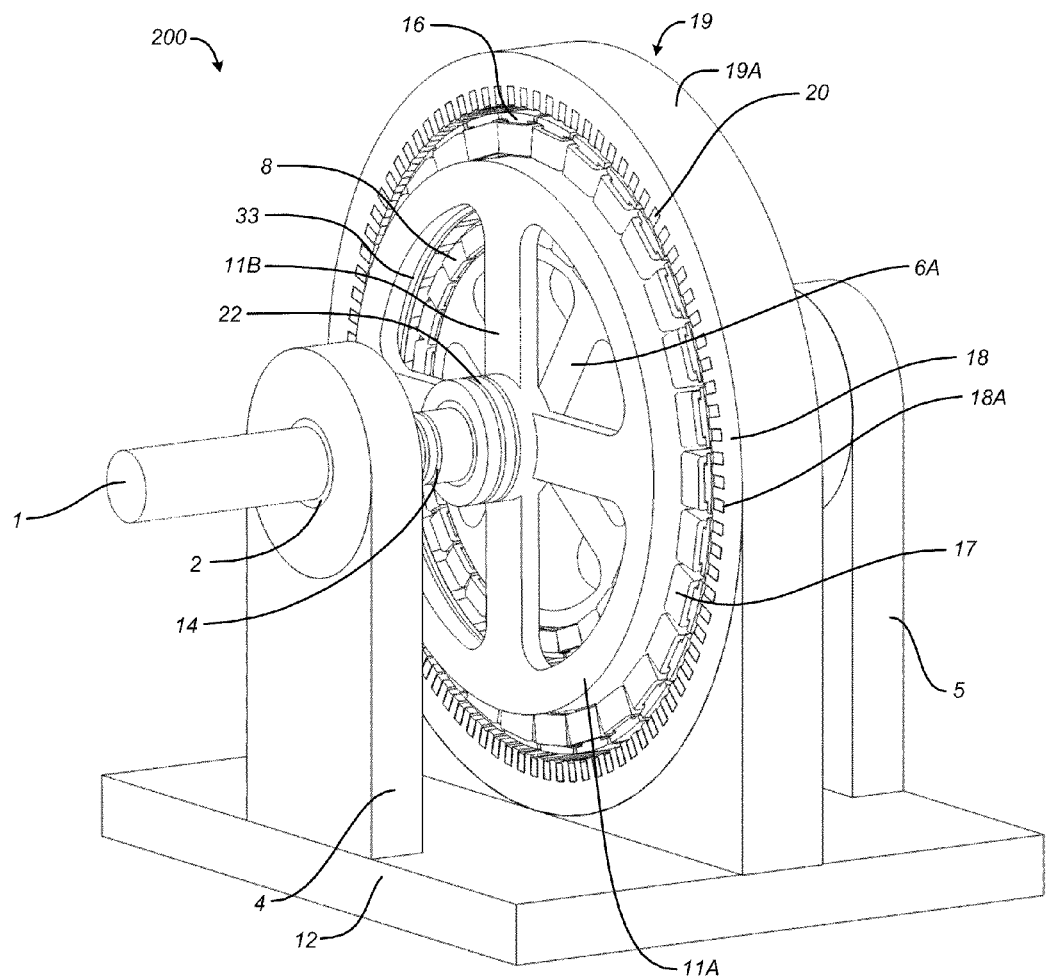
FIG. 4 is a perspective view of an embodiment of the preset invention.
Figure 5:
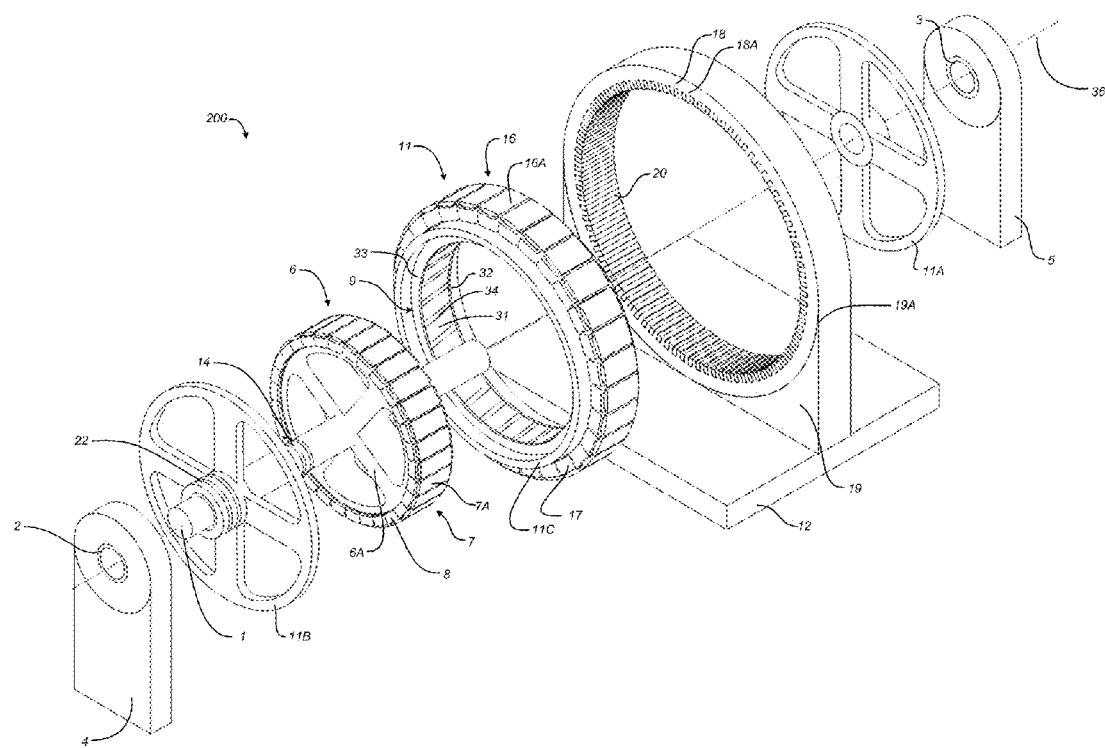
FIG. 5 is a exploded perspective view of the embodiment in FIG. 4.
Figure 6:
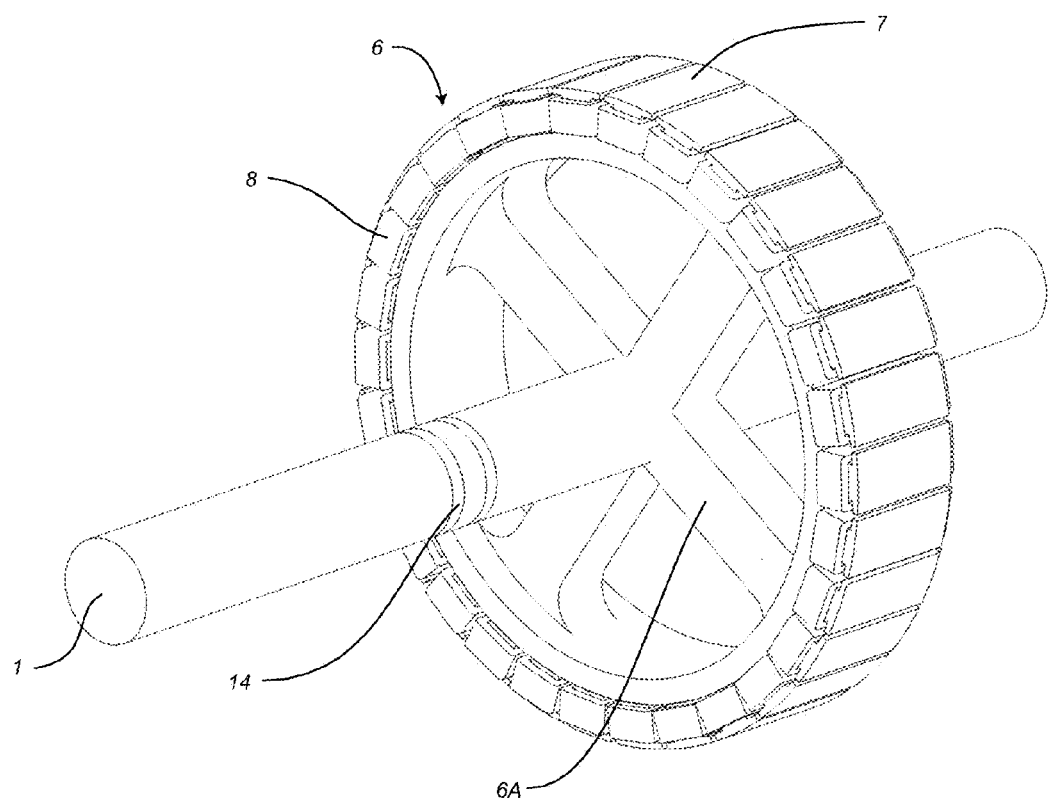
FIG. 6 is a perspective view of the first rotor of the embodiment of FIG. 4.

Referring to FIGS. 4-6, the first rotor 6 includes a plurality of first rotor poles 7A and first rotor pole windings 8. The specific number of first rotor poles 7A and associated first rotor pole windings 8 (as well as the plurality of second rotor poles 16 will be discussed in greater detail below) illustrated in the figures is merely one embodiment. Typically, embodiments of the first rotor 6 and the plurality of first rotor poles 7 and associated first rotor pole windings 8 will typically have a pole count greater than 4. However, designs could have 2 or 4 poles. For most embodiments, the actual pole count will be determined in part by the lowest rated rotational speed in revolutions per minute (RPM) of the prime mover. As a non-limiting example, a direct connected wind turbine prime mover may have a rated rotation speed range from about 12 to about 20 RPM. Using 12 RPM as our rated rotational speed to determine the pole count necessary to obtain a 60 Hz output frequency, we arrive at 600 poles by using the known equation $$p = \frac{120f}{n_s}$$

in which p is the number of poles to be calculated; f is the frequency, or 60 Hz in this example; and $n_s$ is the speed of the rotating field, or 12 RPM in this example.

For a second example, a wind turbine prime mover is connected to a gearbox that is then connected to the input shaft 1 of the VSSG 200. The prime mover rotates at a rate of 12 RPM, which is transmitted to the gearbox. If the gearbox produces a 10 to 1 increase in the rotational speed, the input shaft 1 rotates at 120 RPM, or 10 times the rate at which the prime mover rotates. Thus, the rate at which the input shaft 1 rotates (120 RPM) is used in the above formula to calculate the poles, with the frequency remaining at 60 Hz, resulting at a figure of 60 poles.

Figure 2:
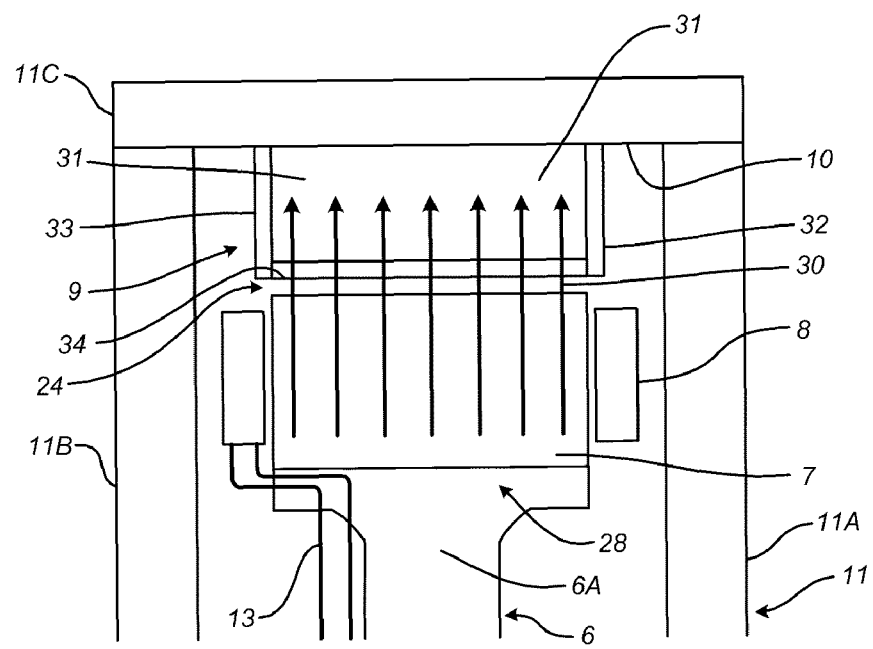
FIG. 2 is an enlarged cross-sectional view depicting the magnetic interaction between a first rotor and a second rotor.

Referring to FIGS. 1 and 2, on a first rotor outer perimeter 28 of the first rotor support 6A the plurality of first rotor poles 7 are positioned and configured to create a first magnetic field 30 when DC current passes through the plurality of first rotor pole windings 8 and as illustrated as a series of field lines across a first air-gap 24 towards a second rotor 11, which, in this embodiment, includes an inverted squirrel cage rotor 9 connected to an underside 10 of the second rotor 11. It is understood that other rotors rather than the inverted squirrel cage rotor 9, such as slip ring rotors and solid core rotors, fall within the scope of the disclosure.

A first DC field current is supplied to the plurality of first rotor pole windings 8 via a first conductor or conductors 13, such as an insulated pair of wires, connected to a first slip ring or rings 14. A first DC field current is supplied by a source to the first brushes 15. The DC field current then proceeds through associated first slip rings 14 via conductors 13 to the pole windings 8. In alternate designs, the first DC field current may be supplied in a brushless configuration without first brushes 15. In such a brushless configuration, the first DC field current is created by a rotating rectifier connected to the input shaft 1 and feeds the first rotor pole windings 8 via two insulated conductors similar to the first conductors 13.

Embodiments of the second rotor 11 optionally include and are constructed of one or more support discs, such as a first outer support disc 11A and second outer support disc 11B; a cylindrical support ring 11C; the inverted squirrel cage rotor 9; a plurality of second rotor poles 16 that are typically, although not necessarily, iron; a plurality of second rotor pole windings 17, typically copper, aluminum, or other metal insulated wire wrapped or coiled concentrically around each of the plurality of second rotor poles 16; and one or more second rotor bearings 26 and 27.

Second rotor bearings 26 and 27 are constructed to allow the first rotor 6 and the second rotor 11 to spin or rotate independently of each other; support a portion or all of the weight of the second rotor 11; and provide a rotational connection point between the first rotor 6 and the second rotor 11.

Figure 3:
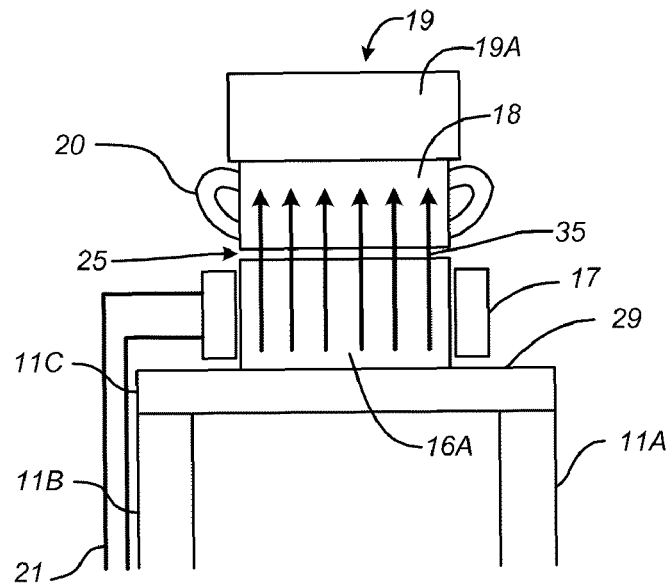
FIG. 3 is an enlarged cross-sectional view depicting the magnetic interaction between a second rotor and a stator.

As best illustrated in FIG. 3, in one embodiment the second rotor poles 16 are composed of iron and, more preferably, iron laminations 16A. However, alternate designs comprising any type of magnetic material and design configuration known in the art fall within the scope of the disclosure. The combination of the plurality of second rotor poles 16A and its concentrically wrapped second rotor pole windings 17 will be referred to as a second rotor poles 16. The second rotor poles 16 are positioned adjoining the support ring outer perimeter 29 of the support ring 11C.

Figure 7:
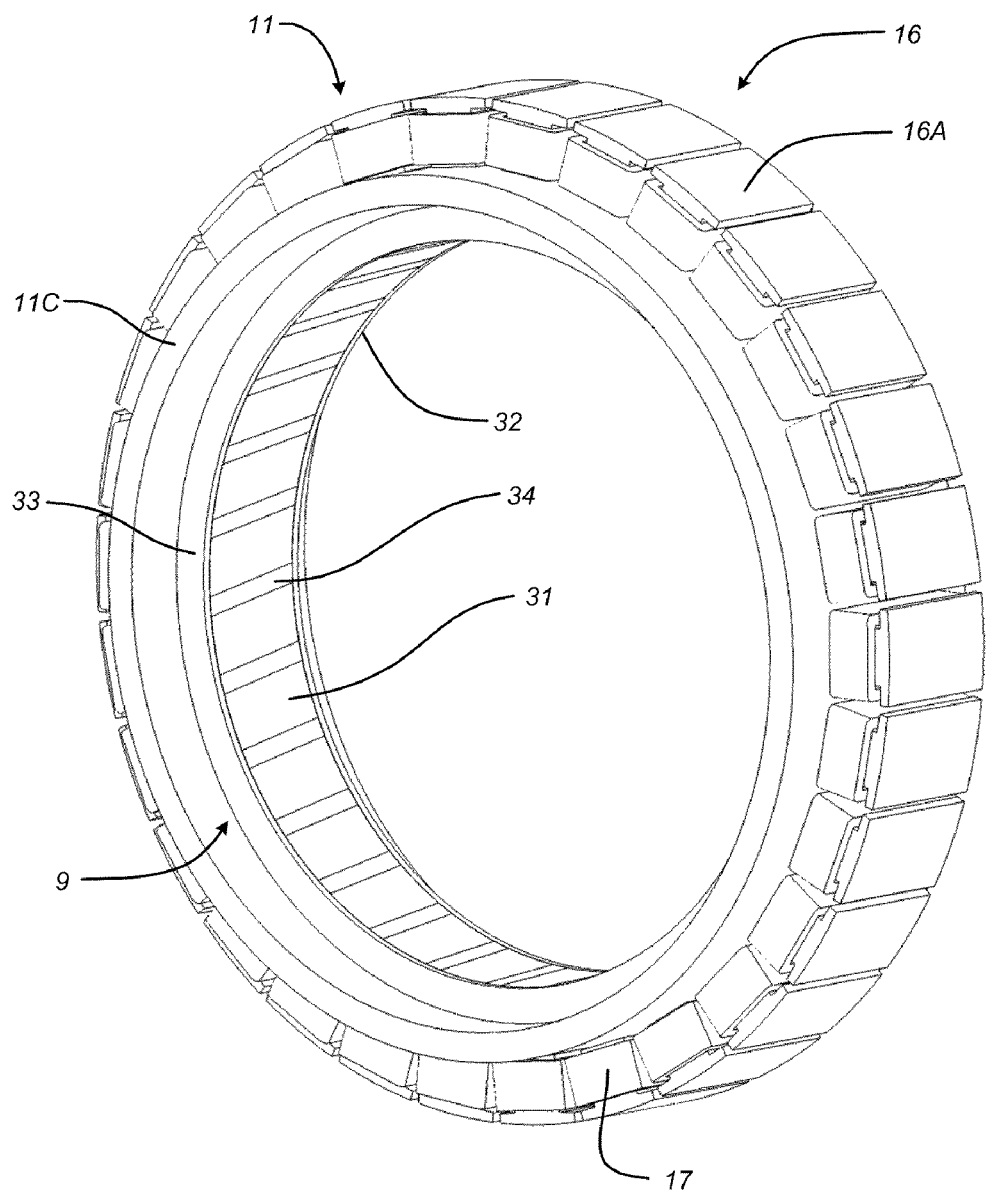
FIG. 7 is a perspective view of the second rotor of the embodiment of FIG. 4 without cylindrical support rings.

As best illustrated in FIGS. 2 and 7, the inverted squirrel cage rotor 9 in various embodiments forms a cylindrical configuration positioned adjoining the underside 10 of the cylindrical support ring 11C and of the cylindrical support ring 11C. The inverted squirrel cage rotor 9 includes a magnetic ring core 31; a first shorting ring or rings 32; a second shorting ring or rings 33; and a plurality of rotor bars 34.

Embodiments of the magnetic ring core 31 include those formed of iron and, more preferably, iron laminations, although alternate designs comprising any type of magnetic material and design configuration known in the art fall within the scope of the disclosure.

Embodiments of the plurality of rotor bars 34 typically are constructed of aluminum or copper, although alternate designs comprising any type of electrically conducting metals, semiconductors, or other similar material and design configuration known in the art fall within the scope of the disclosure. The first shorting ring 32 and second shorting ring 33 connect each of the plurality of rotor bars 34 around a circumference of the inverted squirrel cage rotor 9.

As first discussed above, the first magnetic field 30 interacts with the inverted squirrel cage rotor 9 as best illustrated in FIG. 2. More specifically, as the first magnetic field 30 interacts with each of the plurality of rotor bars 34 a force is created on the plurality of rotor bars 34 that urges the plurality of rotor bars 34 and, consequently, the second rotor 11 to rotate in the same direction as the first rotor 6. Since the rotor bars are integral to the second rotor 11, the entire second rotor 11 follows the first rotor 6. Given the illustrated orientation of the magnetic field 30, the direction of rotation for the first rotor 6 in FIG. 2 is into the paper.

Embodiments include a stator 19. The stator 19 typically, although not necessarily, includes a stator support ring 19A; a stator magnetic core 18 typically formed of iron and, more preferably, iron laminations, although alternate designs comprising any type of magnetic material and design configuration known in the art fall within the scope of the disclosure; a plurality of stator slots 18A configured to receive each of a plurality of stator windings 20, as illustrated in FIGS. 1, 4, and 5. Of course, stators of other configurations known in the art fall within the scope of this disclosure.

The plurality of stator windings 20 are typically copper, aluminum, or other metal insulated wire wrapped or coiled concentrically, each of the plurality of stator windings 20 being received within an associated stator slot 18A. Each of the plurality of stator windings 20 is fashioned and connected so that they match each of the plurality of second rotor poles 16 to produce a selected AC frequency. Typically, although not necessarily, the stator windings 20 are configured to produce three phase electrical power at a selected output frequency, such as 60 Hz, when the second rotor 11 is spinning at rated speed. Alternatively, the stator windings 20 can be configured to produce any number of phases, such as single phase, double phase, quadruple phase, and the like, at any desired frequency, such as 50 Hz and 60 Hz.

As first discussed above and as illustrated in FIG. 3, the second rotor poles 16, 17 are configured and positioned to create a second magnetic field 35 when DC current passes through the plurality of second rotor pole windings 17, as illustrated with a series of field lines across a second air-gap 25 towards a stator 19 and a plurality of stator windings 20. The second rotor pole windings 17 are connected the second DC field current via a second conductor or conductors 21, such as an insulated pair of wires, connected to a second slip ring or rings 22. The second slip rings 22, in turn, are supplied a second DC field current via the second brushes 23 connected to a source of DC current (not shown). In alternate designs, the second DC field current may be supplied in a brushless configuration without second brushes 23. In such a brushless configuration, the second DC field current is created by a rotating rectifier connected to the second rotor 11 and feeds the second rotor pole windings 17 via two insulated conductors similar to the first insulated pair of conductors 21.

Figure 8:
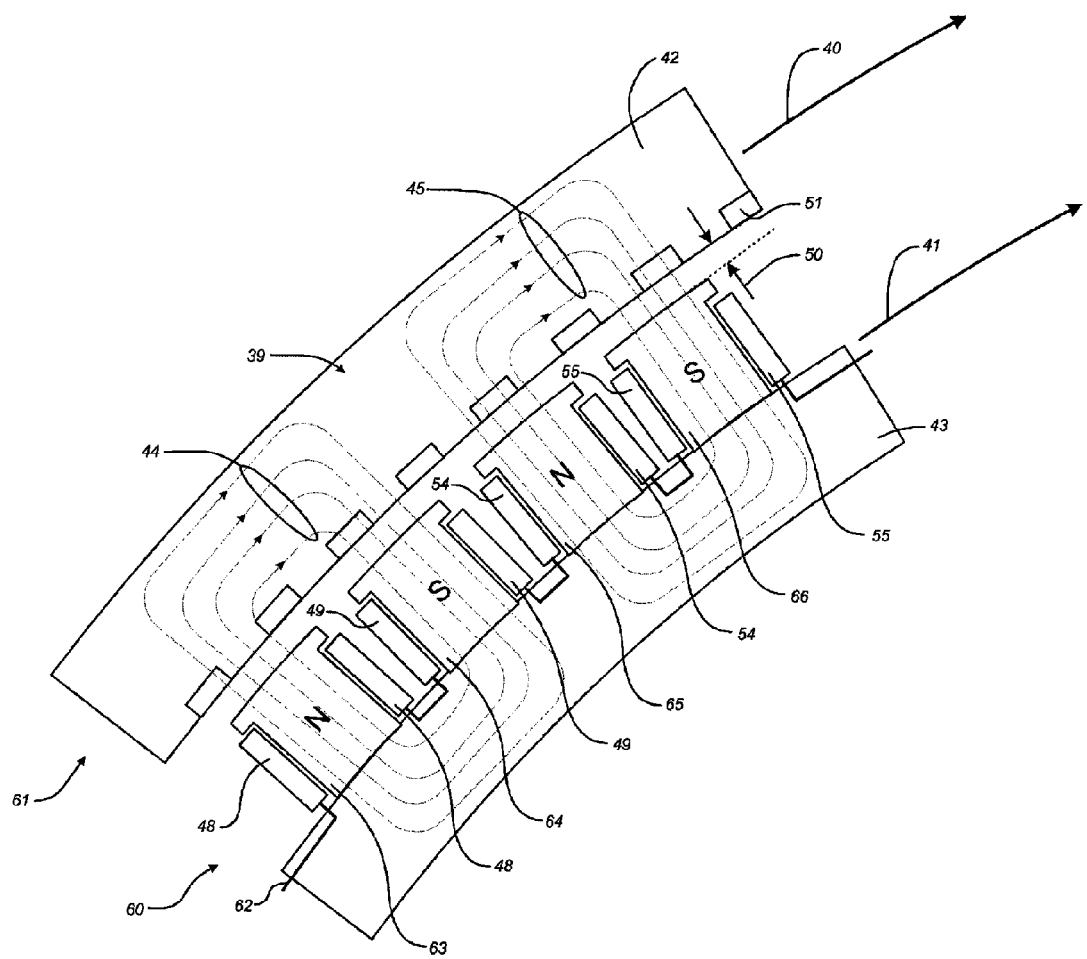
FIG. 8 is a cross-section of a portion of the first rotor and second rotor depicting the magnetic interaction between the first rotor and the second rotor.

FIG. 8 illustrates a simplified cross-sectional view of a first rotor 60 and a second rotor 61 comparable to the first rotor 6 and the second rotor 11 discussed above in FIGS. 1-7. FIG. 8 illustrates a 4 pole portion or segment of the first rotor 60 for clarity. The first rotor 60 includes a plurality of first rotor poles 61, a representative sample of which are first rotor poles 63, 64, 65, and 66 that are formed of iron laminations, as discussed above. As discussed above, a plurality of first rotor pole windings 48, 49, 54, and 55 are wrapped or coiled around the respective first rotor poles 63, 64, 65, 66. The first rotor 60 also includes a first rotor support 43, which typically is magnetic or optionally has a layer of magnetic material attached thereto.

Also illustrated in FIG. 8 is that portion of a second rotor 61 comparable to the second rotor 11 discussed above. The illustrated portion of the second rotor 61 includes a plurality of rotor bars 51 of an inverted squirrel cage rotor 39 comparable to plurality of rotor bars 34 of the inverted squirrel cage rotor 9 discussed above. The inverted squirrel cage rotor 39 also includes a magnetic ring core 42 comparable to the magnetic ring core 31 discussed above.

In operation, a first DC field current from a source of DC current is supplied via conductor 62, similar to the first conductor 13 described above, to the first rotor pole windings 48, 49, 54, and 55. The first DC field current flowing through the first rotor pole windings 48, 49, 54, and 55 creates a first magnetic field 44, 45 that is produced within the first rotor poles 63, 64, 65, and 66. The first magnetic field 44, 45 extends beyond the first air-gap 50, the plurality of rotor bars 51, and reaches the magnetic ring core 42 of the inverted squirrel cage rotor 39. More specifically, the first magnetic field 44, 45 traverses a circuit leaving the first rotor poles 63, 65, or the north poles; travels across the first air-gap 50; crosses a plurality of the rotor bars 51; enters the magnetic ring core 42 of the inverted squirrel cage rotor 39; and returns back across another plurality of rotor bars 51; across the first air-gap 50; through the first rotor poles 64, 66, or the south poles; through the first rotor support 43, which is magnetic; and finally back through the first rotor poles 63, 65.

The first rotor 60 is connected to an input shaft, such as input shaft 1, that, n turn, is connected to a prime mover. Thus, the prime mover imparts a rate of rotation to the first rotor 60 via the input shaft. When the first rotor 60 is rotated in a first direction 41 while a first DC field current is applied to the first rotor pole windings 48, 49, 54, 55, the magnetic field 44, 45 acts on the magnetic core 42 and plurality of rotor bars 51 to urge the second rotor 61 to rotate and follow the first rotor 60 in the same second direction 40. Though the first direction 41 and second direction 40 are shown to be clockwise in FIG. 8, direction of rotation is dependent, in part, on the direction of rotation of the input shaft. In other words, the direction of rotation can be clockwise or counter-clockwise. The resulting movement of the second rotor 61 as caused by the magnetic fields 44, 45 is in the same direction regardless of the polarity of the DC current applied to the first rotor pole windings 48, 49, 54, 55. In other words, the result is the same if a three phase voltage is applied to the windings of a rotor of a three phase induction motor. In the three phase induction motor, a rotating magnemotive force (MMF) is created by the configuration of the three phase stator and the applied three phase voltage. The MMF cross a plurality of rotor bar windings in the same manner as that described above, urging a second rotor to spin in the same direction as the rotating MMF.

The second rotor 61 will thus rotate in the same second direction 40 as the first rotor 60 and will attempt to rotate at the same speed as the first rotor 60. With a perfect machine without energy losses, such as bearing friction, wind resistance, and the like, and when the second rotor 61 is rotating freely (i.e., the stator windings are open circuit and not connected to a grid or load), the second rotor 61 initially lags the first rotor 60 as it does not begin rotating with the first rotor 60 until the first DC field current is applied to the first rotor pole windings 48, 49, 54, 55. The second rotor 61, however, will eventually catch up with the first rotor 60 and spin in synchronism in a system without energy losses. However, in all practical applications, the second rotor 61 will not rotate without some energy loss to bearing friction, wind resistance, and the like. The loads, such as friction, that causes the energy loss will cause the second rotor 61 to slip or lag in the rate of rotation behind the first rotor 60. In other words, slip reflects the difference between the rate of rotation of the second rotor and the rate of the first rotor. The rate of rotation of the second rotor is given by the formula $$n_r = n_s(1-s)$$

where $n_r$ is the rate of rotation of the second rotor 61, $n_s$ is the rate of rotation of the first rotor 60, and s is the slip.

Rearranging the above formula, slip is calculated using the following formula:

$$s = \frac{n_s - n_r}{n_s}$$

with the variables as defined above.

This same slip action is a concept that is common to all embodiments of the invention to provide a selected frequency of AC current as an output from an inconsistent input.

Figure 9:
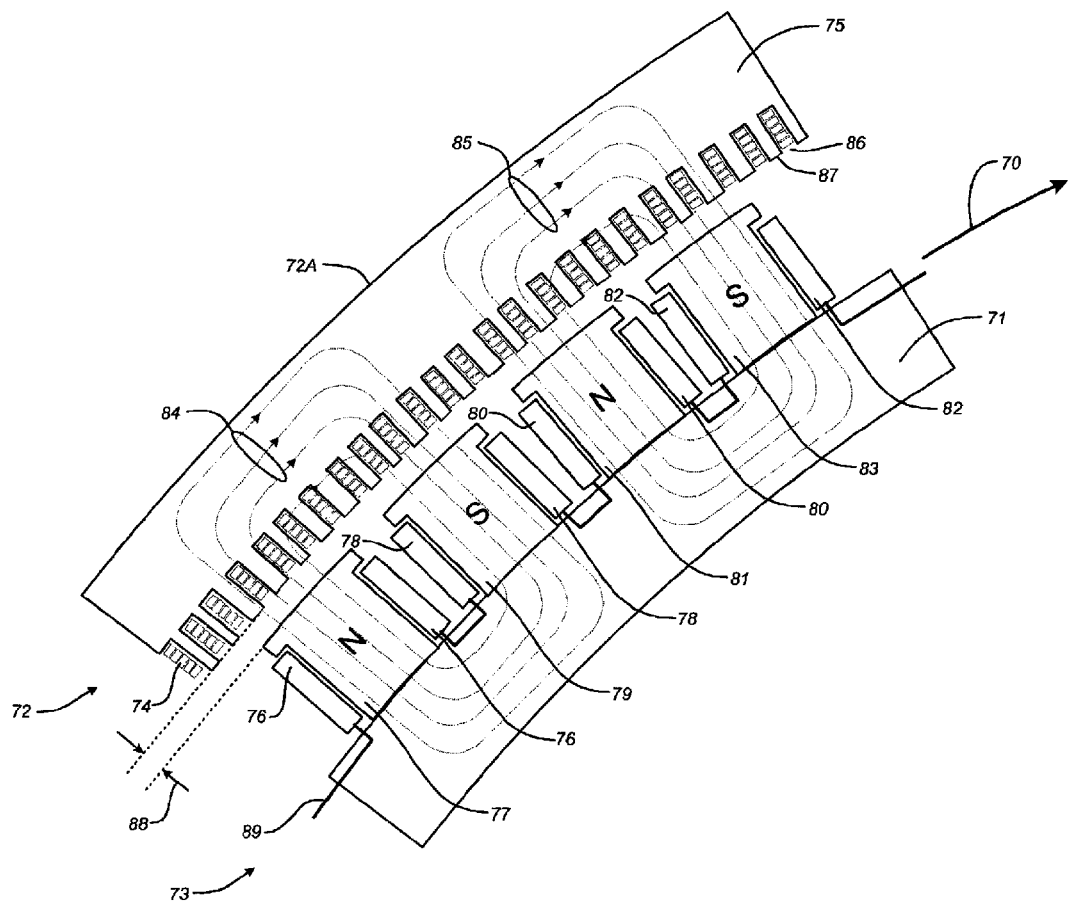
FIG. 9 is a cross-section of a portion of the second rotor and an embodiment of the stator depicting the magnetic interaction between the second rotor and the stator.

FIG. 9 shows a simplified cross-sectional view of a second rotor 73 comparable to the second rotors 11 and 61 discussed previously and a stator 72 comparable to the stator 19. FIG. 9 illustrates a 4 pole portion or segment of the second rotor 73 for clarity. The second rotor 73 includes a plurality of second rotor poles, a representative sample of which are second rotor poles 77, 79, 81, and 83 that are formed of iron laminations, as discussed above and as known in the art. As discussed above, a plurality of second rotor pole windings 76, 78, 80, and 82 are wrapped or coiled around the respective second rotor poles 77, 79, 81, and 83. The second rotor 60 also includes a second rotor support 71 that is made of any suitable magnetic material and is comparable to the cylindrical support ring 11C illustrated in FIGS. 1 and 3 and discussed above.

Also illustrated in FIG. 9 is that portion of a stator 72 comparable to the stator 19 discussed above. The illustrated portion of the stator 72 includes a stator support ring 72A; stator magnetic core 75 comparable to the stator magnetic core 18 discussed above and formed of iron laminations; a plurality of stator slots 86 configured to receive each of a plurality of stator windings 74; and a plurality of stator teeth 87 that are formed from the stator magnetic core 75 and separate adjacent stator slots 86 from each other.

The stator windings 74 are shown as overlaid single conductors in FIG. 9. This is a simplified representation of stator windings 74. One with skill in the art understands and can calculate the specific details related to stator windings, such as the number turns/windings and their positioning within the stator slots 86. Embodiments of each turn of each of the plurality of stator windings 74 is individually insulated and arranged within a stator slot 86 to produce multiple turns of the stator windings 74, such as copper wire or the like from the perspective of the second rotor poles 77, 79, 81, and 83 as each of the second rotor poles 77, 79, 81, 83 move past the stator windings 74. Varying the number of turns effects or varies the output voltage from the stator. Of course, the rotation induces or generates power in the stator windings 74 at the desired voltage and at a frequency that is regulated so that it is essentially stable (e.g., 60 HZ plus or minus a 1-5 HZ) as discussed hereinafter.

In operation, a second DC field current from a source of DC current is supplied via a second conductor 89 comparable to the second conductor 21 described above, to the second rotor windings 76, 78, 80, and 82. The second DC field current flowing through the second rotor pole windings 76, 78, 80, and 82 creates a second magnetic field 84, 85 that is produced within the second rotor poles 77, 79, 81, and 83. The second magnetic field 84, 85 extends beyond the second air-gap 88, the stator windings 74 positioned within the stator slots 86, and enters the stator magnetic core 75. More specifically, the second magnetic field 84, 85 traverses a circuit leaving the second rotor poles 77, 81, or the north poles; travels across the second air-gap 88 and a plurality of stator windings 74; enters the stator magnetic core 75; and returns back across another plurality of stator windings 74; across the second air-gap 88, through the second rotor poles 79, 83, or south poles; through the second rotor magnetic support 71, and finally back through the second rotor poles 77, 81.

The second rotor 73 rotates under the urging and influence of the first magnetic field 44, 45 as discussed above. For purposes of illustration, second rotor 73 rotates in a second direction 70 in FIG. 9, which is the same direction as second direction 40 (clockwise) discussed above in connection with FIG. 8. When the second rotor 73 rotates in the second direction 70 while a second DC field current is applied to the second rotor pole windings 76, 78, 80, 82, a voltage will be produced within the stator windings 74. Connecting this produced voltage via a conduit, such as insulated conductors, to an electrical grid or load will cause a current to flow into the electrical grid or to the load at a frequency related to the rate of rotation of the second rotor 73.

Figure 10:
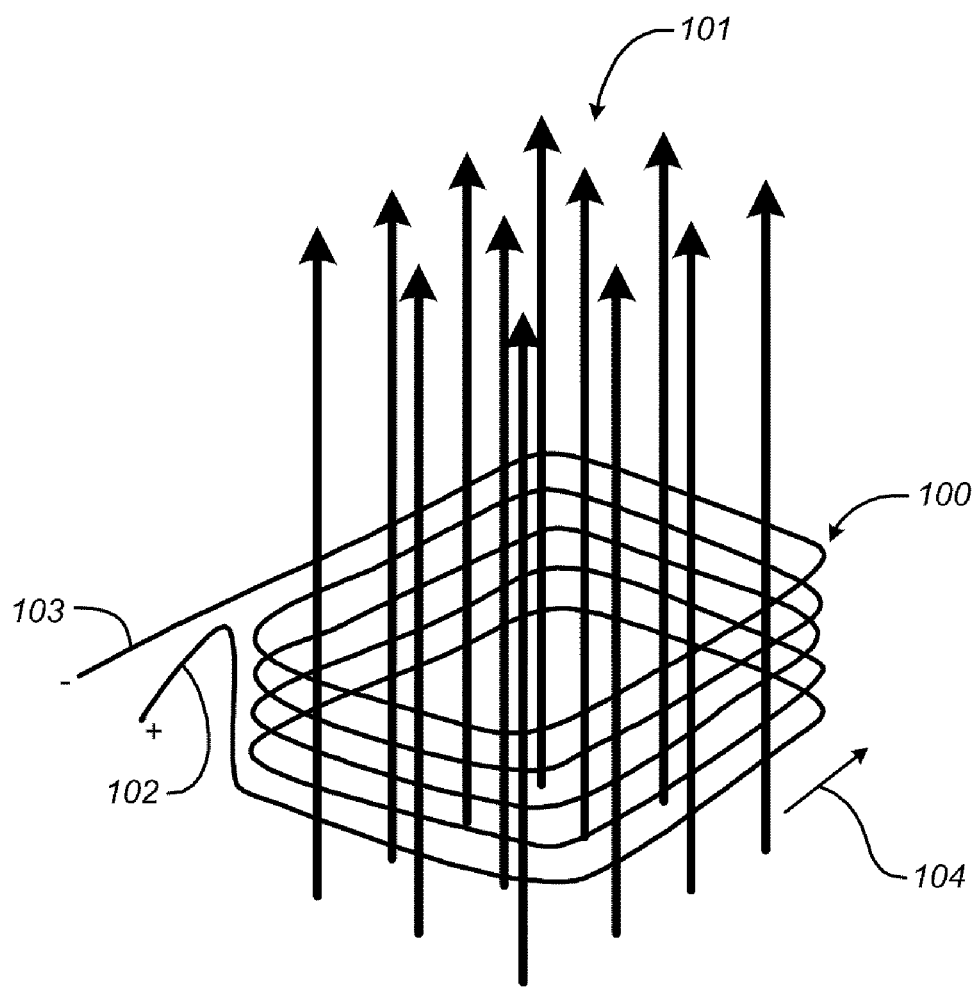
FIG. 10 figuratively illustrates the magnetic interaction, magnetic field movement, and the production of voltage between and across an embodiment of the stator windings.

To clarify the second rotor 73 and stator 72 interactions further, a simplified rotor winding arrangement is illustrated in FIG. 10. As a magnetic field 101 illustrated by the field lines is impressed through the winding 100 and moves laterally in a direction 104 across the winding 100, a voltage is created across the ends 102, 103 of the winding 100 as known from basic physics. The voltage produced across the ends of the winding 102, 103 will vary as the magnetic field 101 moves by, with the magnitude of the voltage being directly proportional to the velocity of the moving magnetic field 101, the magnitude of the magnetic field 101, and the portion of the magnetic field 101 cutting across the winding 100. When the magnetic field 101 first begins to cross the winding 100, i.e., only a small fraction of the magnetic field 101 initially has crossed the winding 100, a small voltage is created across the ends of the winding 102, 103. The voltage across the ends 102, 103 grows in magnitude as the magnetic field 101 moves further across the winding 100 in the direction of 104. When the magnetic field 101 is centered within the winding 100, the voltage produced across the ends of the winding 102, 103 will be at its maximum value. Likewise, as the magnetic field 101 moves further away from the winding 101 in the direction 104, the voltage produced across the ends of the winding 102, 103 will decrease.

When the shape of the voltage waveform across the ends of the winding 102, 103 is inspected (by oscilloscope or a similar instrument), it will be seen that the waveform shape is significantly non-sinusoidal. This means that such a simple winding arrangement would not produce a purely AC-sinusoidal source, which is an important consideration, as a consistent AC-sinusoidal source is important for the smooth operation of machines, particularly large machines.

Machine designers have invented methods to physically spread out and stack the stator windings to produce a nearly perfect sinusoidal voltage waveform (refer to Design of Electrical Apparatus, 3$^{rd}$ Edition, Kuhlmann, Chapter 11, John Wiley & Sons publisher for discussion on such designs). For example, various methods include configuring slots in a magnetic material to receive the windings so that the windings are embedded within the magnetic material, thereby minimizing magnetic flux leakage.

Figure 11:
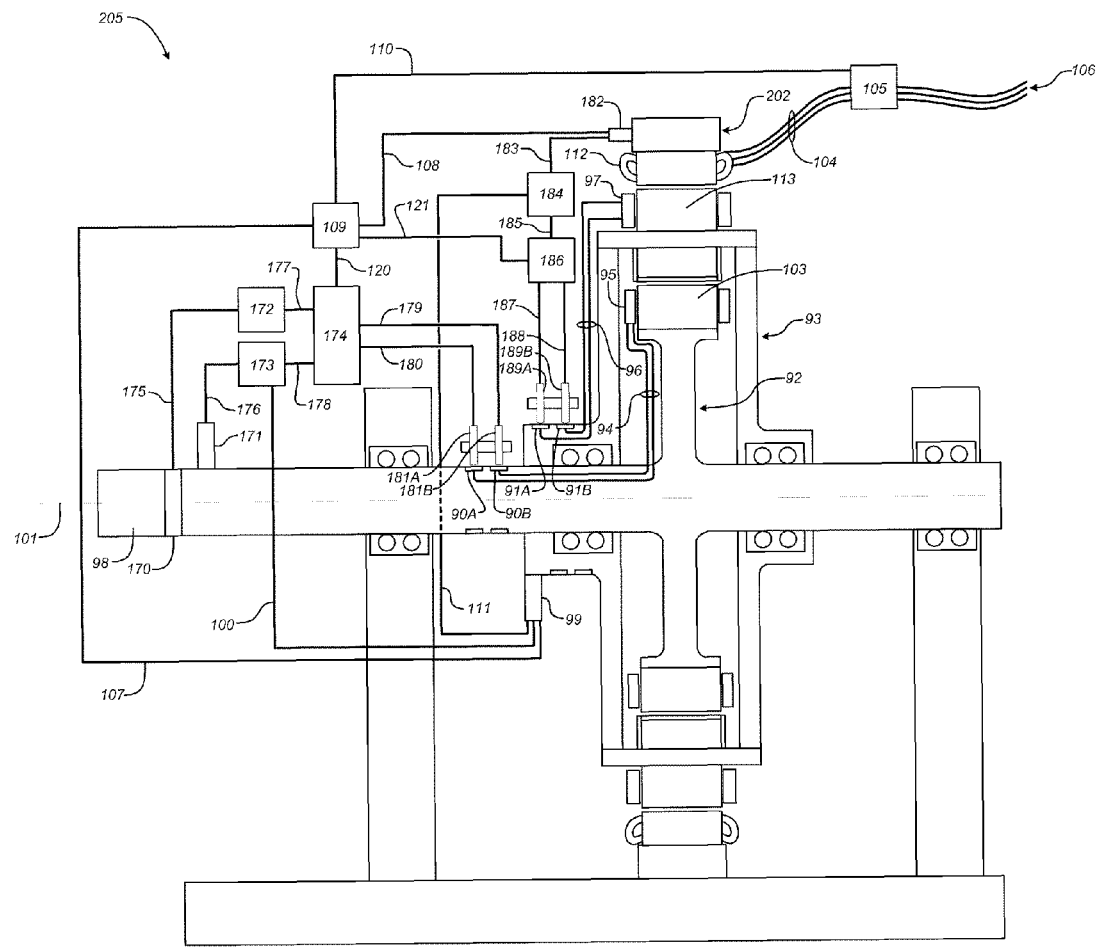
FIG. 11 includes a block diagram of the controller portion of an embodiment of the present invention.

Turning our attention to control, FIG. 11 is created by taking FIG. 1 and adding optional equipment to control the operation and the output. While speed control, torque control and voltage control are discussed, other types of control systems fall within the scope of the disclosure, including those used in particular applications of power generated from wind, water, and other variable sources.

Speed control refers in this instance to controlling a rate of rotation as typically measured in rotations or revolutions per minute (RPM). First, the speed control must be adaptable for machine start-up. Once the first rotor 92 is up to its operating rate of rotation or speed, the speed control must function to synchronize the AC output of the stator 202 with an electrical grid or load. Alternately, a generator as described and not connected to the grid (e.g., operates in a stand-alone mode), speed control is used in a governing mode to keep a frequency of the AC output relatively constant. Speed control may also be used with prime mover loading algorithms for wind and water.

When connecting (synchronizing) a machine as herein disclosed to be connected to an electrical grid, a prime mover (not shown) attached to the input shaft 98 begins to spin the first rotor 92. A first rotor speed sensor 171 detects a rate at which the first rotor 92 (and the input shaft 98 connected thereto) is rotating. Non-limiting examples of such sensors include magnetic detectors that count the number of times a magnet attached to a shaft passes the detector in a period of time, optical encoders that use light in similar matter, belts and gears for electrical-mechanical encoders, and other devices known in the art. The first rotor speed sensor 171 generates a speed level signal reflective of the speed, typically the rate of rotation of the input shaft, and transmits the speed level signal via connection 176, such as an electrical or optical connection, to a speed controller 173, which may be an electromechanical mechanism, a general purpose computer with a program that accepts the speed level signal as an input and outputs a speed control signal to the VSSG 205, a purpose built computer that accepts the speed level signal as an input and outputs a speed control signal to the VSSG, and other types of speed controllers known in the art.

On starting the prime mover and rotating the input shaft 98, the speed controller 173 algorithmically determines (specific to a given application, such as wind or water) when the first rotor 92 speed or rate of rotation has reached an appropriate rate of rotation at which a first DC field current can be transmitted to the first rotor 92 in order to start rotating the second rotor 93 through the process described above. In order to accomplish this, the speed controller 173 generates a first DC current level control signal that it transmits via connection 178 to the first DC field current controller 174. An example of the first DC field controller 174 is a DC current supply whose specifications are particular to a given application. The first DC field controller 174 receives a first DC current level control signal and, in response to the first DC current level control signal produces a selected first DC field current. To produce a selected first DC field current, the first DC field current controller 174 generates a DC voltage across conductors 179 and 180 that drives a first DC field current into the first rotor pole windings 95 via first brushes 181A and 181B, first slip rings 90A and 90B, and first conductors 94.

As the second rotor 93 is not rotating yet—recall that this is a situation in which the embodiment VSSG 205 was initially not operating—the first DC field controller 174 generates a first DC field current that will create a magnetic field that couples the second rotor 93 with the already rotating first rotor 92 as described above. (In applications of the embodiment VSSG 205 it is not unusual to have residual magnetism in the first rotor poles 103 and the first rotor pole windings 95 cause the second rotor 93 to begin rotating slightly before the speed controller 173 transmits a first DC current level control signal to increase the first DC current to the first DC field controller 174.)

A second rotor speed sensor 99 similar in type and effect to the first rotor speed sensor 171 detects a speed or rate of rotation of the second rotor 93. The second rotor speed sensor 99 then generates a second rotor speed level signal reflective of the speed or rate of rotation of the second rotor 93 and transmits the second rotor speed level signal by connection 100 to the speed controller 173. The speed controller 173 then algorithmically determines (specific to a given application, such as wind or water) the amount of first DC current that is necessary to achieve a desired speed or rate of rotation for the second rotor 93. The speed controller 173 therefore receives two speed level signals, one from the first rotor speed sensor 171 and the second from the second rotor speed sensor 99, and uses both to determine an appropriate DC current level signal to transmit via connection 178 to the first DC field current controller 174.

In one embodiment, both the first rotor speed sensor 171 and the second rotor speed sensor 99 are used by the speed controller 173 to determine the effective coupling and slip between the first rotor 92 and the second rotor 93 in response to changes in the first DC field current. That is, the amount of coupling between the first rotor 92 and second rotor 93 is proportional to the amount of the first DC field current flowing into the first rotor pole windings 95.

Embodiments of second rotor speed sensor 99 include transmitting a second rotor speed level signal not only to the speed controller 173, but optionally also to the stator voltage controller 184 and optionally to the synchronizer 109 via connections 100, 111, and 107 respectively. The rate of rotation or speed of the second rotor 93 speed can be used in several parts of the control system. While some embodiments use a second rotor speed level in the three controllers discussed, other embodiments use the second rotor speed level signal in more or fewer controllers.

Embodiments of the first DC field current controller 174 receives a DC current control level signal from the speed controller 173, and/or a torque controller 172, and/or a synchronizer 109, and calculates (specific to a given application, such as wind or water) a selected first DC field current to deliver to the first brushes 181A and 181B via conductors 179 and 180. In an embodiment of the first DC field current controller 174, the first DC field current controller 174 calculates the additive effect of each of three DC current control level signals via connections 177, 178, and 120 to create a single first DC field current to supply to the first brushes 181A and 181B via conductors 179 and 180.

During the initial operation in which the second rotor 93 begins to rotate, a stator voltage controller 184 sends signals to send a second DC field current to the second rotor pole windings 97 to create a voltage on an output of the stator windings 112. This is accomplished by first having the second rotor speed sensor 99 transmit the second rotor speed level signal reflective of the rate at which the second rotor is rotating to the stator voltage controller 184 via connection 111. The stator voltage controller 184 then calculates (specific to a given application, such as wind or water) at what level to set a second DC field current level control signal. A second DC field current controller 186, such as a DC current supply, receives the second DC current level control signal and, in response to the second DC current level control signal produces a selected second DC field current. To produce a selected second DC field current, the second DC field current controller 186 generates a DC voltage across conductors 187 and 188 that drives a second DC field current into the second rotor pole windings 97 via second rotor brushes 189A and 189B, second slip rings 91A and 91B, and second conductors 94.

With this second DC field current flowing into the second rotor pole windings 97, a second magnetic field is created as discussed above vis-à-vis FIG. 9. The second magnetic field when combined with the rotational speed of the second rotor 93 produces a sinusoidal voltage at the ends of the stator windings 112. (In applications of the embodiment VSSG 205 it is not unusual to have residual magnetism in the second rotor poles 113 and second rotor pole windings 97 cause a voltage to appear at the end of the stator windings 112 before the stator voltage controller 184 transmits a second DC current level control signal to increase the second DC field current to the second DC field current controller 186.)

Embodiments of the stator voltage controller 184 also receive a stator voltage signal from the stator voltage sensor 182 via connection 183. The stator voltage sensor 182 can either be a direct connection to the output of the stator windings 112, i.e. a direct measurement of the stator voltage, or use a device, such as a potential transformer and/or voltage transducer, to convert the stator voltage into a stator voltage signal reflective of the stator voltage that is useable by the stator voltage controller 184. Methods of controlling the stator voltage include: 1) excitation control of the second DC field current flowing into the second rotor pole windings 97 and 2) speed control of the second rotor 93.

Excitation control of the second DC field current is implemented in the stator voltage controller 184, typically through the use of an automatic voltage regulator (AVR). An AVR receives the stator voltage signal reflective of the stator voltage and that is created by the stator voltage sensor 182. The stator voltage controller 184 receives the stator voltage signal via connection 183 and compares the stator voltage signal against a selected voltage set-point, i.e. an AC output at a selected voltage suitable for integration into an electrical grid or load. For example, if the stator voltage signal is lower than the voltage set-point, the stator voltage controller 184 will generate a second DC field current level signal reflective of a needed increase in the second DC field current to the second DC field current controller 186 in order to adjust the stator output voltage to a higher level. Similarly, if the stator voltage signal is lower than the voltage set-point the stator voltage controller 184 will generate a second DC field current level signal reflective of a needed decrease in the second DC field current to the second DC field current controller 186 in order to adjust the stator output voltage to a lower level. The stator voltage control is implemented in a real-time feedback control circuit, of which the stator voltage sensor 182, the stator voltage controller 184, and the second DC field current controller 186 are parts. The stator voltage is thereby adjusted to respond to changes caused by increases and/or decreases in the loading. Thus, the stator voltage controller 184 complements the effect of the speed controller 173.

Speed control of the second rotor 93 is typically necessary for three modes of operation: 1) when synchronizing to a grid; 2) to respond to frequency events while connected to the grid; and 3) when operating in stand-alone mode. The first mode was discussed previously.

Addressing the second mode of operation, when the VSSG is already synchronized to an electric grid or system already powered by a source at 60 HZ, the electric grid itself may cause the VSSG to see a significant frequency excursion (3-10 HZ) as power loads are added or dropped. Most power generators already connected to the electric grid will have a speed governor that regulates the output power of each generator. Under certain conditions, for example, when there is a major loss of electric generation capability connected to the electric grid, the frequency of AC current on the electric grid will decrease. The speed governor of each power generator connected to the electric grid "sees" the decrease in the frequency of the AC current on the grid and compensates by increasing the power output of its generator to help increase the frequency of the AC current on the electric grid. Thus, the power needed to compensate for a large frequency drop on the electric grid is shared in part by each of the generators connected to the electric grid. This type of shared control over the frequency of the AC current on the electric grid effected by the speed governor's on each generator is referred to as "droop control." The name results from the observation that the speed governors of each generator allow the frequency and the power output of the generators to "droop" once the normal operating frequency of the AC current on the electric grid is restored. That is, to get system-wide sharing, the speed governors for each grid connected generator are set up with a droop control feature that does not have the ability to bring the grid back to synchronous frequency (60 HZ for example in the United States). Instead, it will get, say 80% of the way back, but will have a steady state "droop" of 20% until the main dispatch control centers send signals to all of the affected generators to raise the power output of each generator an additional amount. Therefore, a preferred design includes a speed control means that includes droop control. This type of control is necessary when grid connected.

Using droop control for a speed governor on a power generator connected to an electric grid is an accepted industry practice because most power generators connected to the electric grid have a prime mover with a throttle, such as natural gas powered turbines. Throttle-controlled generators are quickly able to increase their power output and, therefore, can quickly increase output to compensate for a decrease in the frequency of the electric grid. Since there could be many types of prime movers connected to the embodiment VSSG 205, including throttled prime movers such as natural gas, coal, and nuclear, this discussion is included on droop control for those embodiments in which the prime mover has the ability to either temporarily or in a sustained manner increase its power output on command.

However, if a power generator connected to an electric grid is also connected to variable/environmental prime mover such as a wind turbine or water turbine, there may be no desire to include a speed control means for the purpose of "aiding" the electric grid with power when the electric grid is in distress, such as a severe frequency depression. This is so because power generators with environmental prime movers typically cannot control the environmental energy source, such as wind velocity, to supply their power. Under these conditions, the power generator may not have any ability to increase its power output, not least for the reason that it typically has been designed to extract the maximum power from the environmental source at all times. A power generator with an environmental prime mover typically would have no need to incorporate a speed governor when connected to the electric grid. Thus, for most environmental applications, embodiments of the disclosed generator typically will not include a speed governor that responds to demand from the electric grid, such as large decreases in frequency.

When a generator is operating in a stand-alone mode, a speed controller is typically necessary to maintain the frequency of the output near the synchronous frequency, such as 60 Hz in the United States. A reason to maintain the frequency of the stator voltage near a synchronous frequency is that the machine may be supplying loads (such as electric motors) that are designed to operate with a supplied voltage at or near rated frequency. If the loads or motors, in this example, are repeatedly exposed to electric currents over or under the synchronous frequency, say 60 Hz±6 or more Hz, the motor may experience excessive heating that could cause premature failure or otherwise shorten its operating life. Indeed, if the disclosed machine itself operates above or below the designed frequency range while loaded the device could prematurely fail or otherwise have its expected operating life decreased. Therefore, the generator disclosed typically is designed/programmed to maintain a particular synchronous frequency at its stator voltage output.

Note that speed control and frequency control are really one and the same, with the exception being only that speed is a mechanical value (RPM or revolutions per minute) and frequency is an electrical value (Hertz or Cycles per Second). When the disclosed machine is operating within its range of speeds or rotations per minute it will also be operating within its rated stator voltage frequency/synchronous frequency. Speed or rate of rotation and the frequency are linearly related as the equations explained above demonstrated.

As the previous discussion demonstrates, it typically is desirable to include some method of speed and/or frequency control within the illustrated generator. Effectively controlling the speed and/or the frequency of the machine operating in a stand-alone mode requires a surplus of power generated by the machine. In other words, for the machine to adequately perform speed or frequency control in a stand-alone mode the power generated by the embodiment VSSG 205 less any mechanical and/or electrical losses of the machine must be greater than what is demanded. The quantity demanded will be referred to as deliverable power.

For a conventional generator with a fossil fueled prime mover that has fuel and that has not been derated during operation, such as a gas turbine that has a drop in deliverable power as ambient temperature increases, the deliverable power is a constant value. The electric grid or load connected to the generator may demand from zero percent up to 100 percent of the deliverable power and the generator will be able to maintain synchronous speed and frequency.

The deliverable power of a generator with an environmental prime move, such as a wind turbine, changes as the wind speed changes. Thus, deliverable power of a generator with an environmental prime mover is typically not constant because it changes in real-time in response to the environmental input except in brief and rare circumstance when the environmental input is of sufficient strength and consistency to provide constant deliverable power. As with throttled prime movers, the power demand on a disclosed generator connected to an environmental prime mover cannot exceed the deliverable power. Under conditions where the power demand on the disclosed generator is greater than the deliverable power, the disclosed generator will continue in a downward decrease in speed until it is forced to trip offline to keep from damage. In effect, the load on the disclosed generator that is greater than the deliverable power will cause the disclosed generator to stall. Thus, it is necessary to employ speed controllers to ensure that the disclosed machine operates within its range of deliverable power.

When operating in stand-alone mode and within the deliverable power of the disclosed machine and prime mover, speed control will be used to hold the second rotor 93 very near the rated or synchronous speed of the disclosed machine. This type of speed control is referred to as "isochronous" control and does not include any droop. The speed control thus has as its goal to maintain synchronous frequency as the load demand increases and decreases. To obtain this control response, the second rotor speed sensor 99 measures a speed or rate of rotation of the second rotor 93 and generates a speed level signal reflective of that speed and transmits it via connection 100 to the speed controller 173. The speed controller 173 then compares the speed level signal reflective of the speed of the second rotor 93 against a selected speed set-point that represents the synchronous speed. If the speed level signal is below the speed set-point the speed controller 173 transmits a second DC field current level signal reflective of the slow speed via connection 178 to the first DC field current controller 174. The first DC field current controller 174 increases the first DC field current in response to the signal and transmits the increased first DC field current to the first rotor pole windings 95 via connections 179 and 180, brushes 181A and 181B, slip rings 90A and 90B and the first conductors 94. The increased first DC field current will increase the strength of the first magnetic field 44, 45 as illustrated in FIG. 8 and discussed above, thereby increasing the coupling strength between the first rotor 92 and second rotor 93, which causes an increase in torque transferred across the first air-gap 50. The increase in torque thus generated will draw more power from the prime mover connected to the input shaft 98.

Similarly, if the speed level signal is above the speed set-point, then the speed controller 173 transmits a first DC field current level signal reflective of the high speed level signal via connection 178 to the first DC field current controller 174. In response, the first DC field current controller 174 will decrease the first DC field current to the first rotor pole windings 95 via connections 179 and 180, brushes 181A and 181B, slip rings 90A and 90B, and the first conductors 94. This will decrease the strength of the first magnetic field 44, 45 as illustrated in FIG. 8 and discussed above and thereby decrease the coupling strength between the first rotor 92 and second rotor 93. This, in turn, causes a decrease in the torque transferred across the first air-gap 50. The decrease in torque will result in less power drawn from the prime mover connected to the input shaft 98. Embodiments of the speed controller 173 implement this speed regulating control in a continuous feedback control method. Industry practice calls such speed control a "speed governor" or simply a "governor." Alternative embodiments of the speed controller 173 include any form of control that may be used to supply the appropriate increase and decrease in DC field current level signal.

At this point, how the prime mover will respond to an increase or decrease in the coupling, i.e. the torque, between the first rotor 92 and second rotor 93 is determined by the type of prime mover and its particular application. With a wind turbine, for example, one mode of response would be to alter blade pitch so that more or less power is being extracted from the wind. Also, in many environmental applications, there will most likely be an interlinking between the speed controller 173 and a prime mover loading controller so that the prime mover is regulated to optimally extract power from an environmental source as well as hold the speed of the second rotor 93 at its rated or synchronous speed.

There may also be a necessity within a given application to control the torque directly between the first rotor 92 and the second rotor 93. If such a need exists, the torque control will be accomplished by including a torque sensor 170, such as strain gauges, current loop torque gauges, and other similar gauges that measures the torque and generates a torque level signal reflective of the measure torque. The torque sensor 170 transmits the torque level signal via connection 175 to the torque controller 172. The torque controller 172 calculates (specific to a given prime mover application) a first DC field current level signal reflective of the torque level signal and transmits the first DC field current level signal via connection 177 to the first DC field current controller 174. The first DC field current controller 174 will then supply the appropriate amount of first DC field current to the first rotor pole windings 95 via connections 179 and 180, first brushes 181A and 181B, first slip rings 90A and 90B and the first conductors 94. An example of a situation in which torque control is desirable is one in which a wind turbine is the prime mover and where gusting is creating sudden impacts to the disclosed machine. To lessen the impact of the gusting the torque controller 172 can reduce the torque applied by signaling the first DC field current controller 174 to decrease the first DC field current in the manner described previously. This decrease in torque between the first rotor 92 and the second rotor 93 thereby compensates for the sudden increase in torque on the input shaft 98 created by the gust.

With a disclosed machine connected to an electric grid, the speed controller 173 and the stator voltage controller 184, in conjunction with a synchronizing relay, can be used to properly synchronize and connect a disclosed machine to the electric grid. To apply the synchronizing relay, a stator voltage level signal is supplied by the stator voltage sensor 182 via connection 108 to the synchronizing relay 109. In addition, a speed or rate of rotation of the second rotor 93 is measured by the second rotor speed sensor 99, which generates a second speed level signal reflective of the speed of the second rotor 93. The second speed sensor 99 transmits the second speed level signal via connection 107 to the synchronizing relay 109. The synchronizing relay 109 calculates how to adjust the speed control, stator voltage control and the closure operation of the main breaker 105, which couples the stator windings 112 to the electric grid 106 via the connection 104. More specifically, appropriate signals are sent from the synchronizing relay 109 to the three controls: 1) speed control is effected by sending a first DC field current level signal to the first DC field current controller 174 via connection 120 to increase or decrease the speed at which the second rotor 93 rotates; 2) stator voltage control is effected by sending a second DC field current level signal to the second DC field current controller 186 via connection 121 to increase or decrease stator voltage; and 3) main VSSG breaker 105 closure is effected by sending a close breaker signal to the main VSSG breaker 105 via connection 110. Thus, the synchronizing relay performs all control necessary to properly synchronize the VSSG and connect it to the grid.

Concluding our description of the controls of the disclosed machine, we would note that though no interconnections have been shown between any of the controls in FIG. 11, especially for environmental prime movers, all controls work together to properly start, energize and run the disclosed machine in most cases.

In regard to the transfer of power from the input shaft 98, it should be noted that to transfer torque from the first rotor 92 to the second rotor 93 there must be a speed difference between the two rotors as discussed above with respect to slip. Let us consider a grid connected mode, where the disclosed machine is operating and connected to the electric grid. In this case, the second rotor 93 will be spinning at an RPM such that the frequency of the AC current thereby generated at the stator matches the frequency of the electric grid. Thus, it can be said the second rotor 93 interacts with the stator windings 112 to produce a synchronous generator as discussed previously. Therefore, unless an unusual event causes the second rotor 93 to lose synchronism, the second rotor 93 will be spinning at a predominantly fixed speed which is directly related to the predominantly fixed frequency of the grid.

For mechanical power to be transferred from the prime mover connected to the input shaft 98 and converted into electrical power at the stator terminals, the first rotor 92 must be spinning faster than the second rotor 93. For example, assume a fixed first DC field current flowing into the first rotor pole windings 95, thereby supplying a fixed magnetic field 44 and 45 as illustrated in FIG. 8 and discussed above. The fixed magnetic field 44, 45 results in a fixed amount of coupling and torque between the first rotor 92 and the second rotor 93 once a steady state condition is achieved. Should the speed or rate of rotation of the first rotor 92 then increases and recalling that speed or rate of rotation of the second rotor 93 is nearly constant, the torque across the first air-gap 50 must increase, which produces an increase in the power output at the stator terminals. As mentioned, this physical relationship in which the speed of the first rotor 92 is slightly faster than the speed of the second rotor 93 is termed "slip," and is similar to the slip action seen in an induction motor.

Unlike an induction motor, however, the slip of the disclosed machine between the first rotor 92 and the second rotor 93 is in the opposite direction. Another difference between an induction motor and the disclosed machine is that the rotor of an induction motor spins slower than the synchronous speed. As the load on an induction motor increases, the speed of the rotor decreases or slips further.

In the disclosed machine, on the other hand, the input shaft 98 and thus first rotor 92 must spin faster than then second rotor 93 that is spinning at synchronous speed and, as the speed of the first rotor 92 increases it slips ahead of the second rotor 93 and thereby increases torque and power, as explained above. If the prime mover can supply the power increase, then the prime mover connected to the input shaft 98 and thus the first rotor 92 will stay at the same speed. If the prime mover cannot supply the call for a power increase, then the prime mover 98 and the first rotor 92 begin to slow in speed, which results in the first rotor 92 being ahead of the second rotor by a smaller margin, or slipping ahead less.

Figure 12:
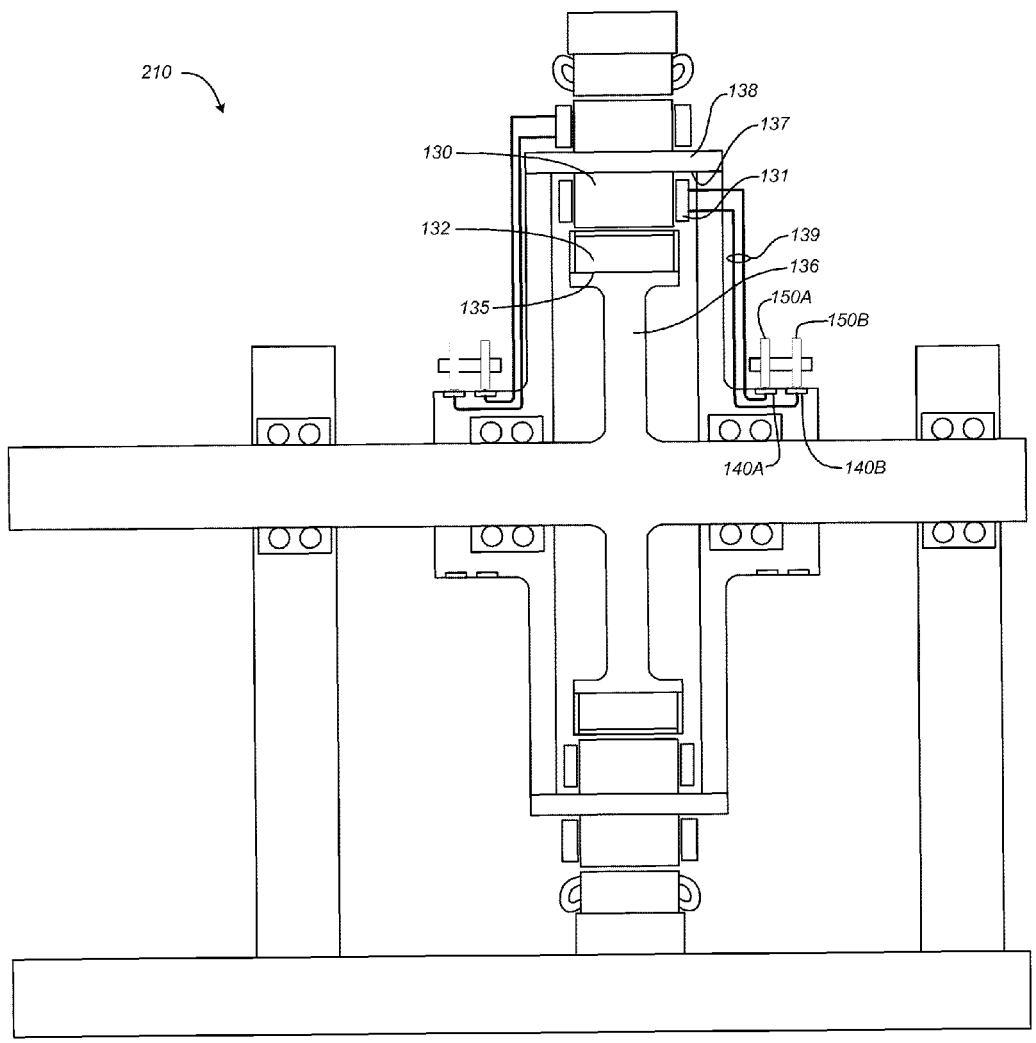
FIG. 12 is a cross sectional view of another embodiment of the present invention.

In FIG. 12 an alternate embodiment of the disclosed machine is illustrated in which first rotor poles 130 swap position with an inverted squirrel cage rotor 132. In this embodiment, the squirrel cage rotor 132 is now non-inverted and is wrapped concentrically on the outer perimeter 135 of the first rotor support 136. Likewise, the first rotor poles 130 that were on the outer perimeter 135 of the first rotor support 136 are now turned upside down and connected on the underside 137 of the cylindrical support ring 138. To reflect this changed configuration, the first rotor poles 130 are more accurately called the second rotor underside poles 130 and the second rotor pole windings 131. This embodiment is also accompanied with a move of the first brushes, first slip rings, and first conductors to the second rotor and referred to as second rotor underside pole brushes 150A and 150B, second rotor underside slip rings 140A and 140 B, and second rotor underside conductors 139. All other behaviors of the relocated components are identical to the discussion already supplied.

In embodiments like that of FIG. 1 and FIG. 11, the installation is depicted in what can be regarded as a general horizontal configuration with the axis 36 in FIG. 1 and axis 101 in FIG. 11 in a general horizontal orientation. However, it should be understood that the axis 36 and the axis 101 may be vertical or at some other orientation as desired by the user.

The one or more present inventions, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure.

The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A generator for producing AC electrical power from a variable speed prime mover, said generator comprising:
   an input shaft which is rotatable at variable rotational rates;
   a first rotor connected to said input shaft for rotation at variable rotation rates by said input shaft, said first rotor having a perimeter with a plurality of first rotor poles positioned thereabout, said rotor poles being configured to generate a magnetic field;
   a second rotor having a plurality of second rotor poles configured to magnetically interact with the magnetic field of said first rotor to be urged to rotate in the same direction of rotation of said first rotor;
   a stator placed concentrically around said second rotor, said stator having a plurality of windings positioned thereabout, said second rotor and said stator each being configured for the second rotor poles to induce an AC electrical power in said stator;
   a first source of DC electrical power connected to said first rotor to supply a DC electrical current thereto;
   a second source of DC electrical power connected to said second rotor to supply a DC electrical current thereto;
   a speed sensor positioned and configured to sense the rotation rate of said second rotor, said speed sensor configured to supply a second rotor rate signal reflective of said rotation rate of said second rotor;
   a speed adjuster connected to one of said first rotor, said second rotor and said first source of DC electrical power to vary said rotation rate of said second rotor;

a speed controller connected to said speed sensor to receive said second rotor rate signal and connected to said speed adjuster to supply a speed control signal to said speed adjuster to vary said rate of rotation of said second rotor:

a torque sensor positioned and configured to sense a torque between said first rotor and said second rotor, said torque sensor configured to supply a torque level signal reflective of said torque between said first rotor and said second rotor;

a torque adjuster connected to one of said first rotor, said second rotor and said first source of DC electrical power to vary said torque;

a torque controller connected to said torque sensor to receive said torque level signal and connected to said torque varying means to supply a torque control signal to said torque adjuster to vary said torque a stator voltage sensor positioned and configured to sense said stator voltage, said stator voltage sensor configured to supply a stator voltage level signal reflective of said stator voltage;

a stator voltage adjusted connected to said second rotor and said source of DC electrical power to vary said stator voltage; and, a stator voltage controller connected to said stator voltage sensor to receive said stator voltage level signal and connected to said stator voltage adjuster to supply a stator voltage control signal thereto to vary said stator voltage.

2. The generator of claim 1, wherein said second rotor comprises an inverted squirrel cage rotor.

3. The generator of claim 1, wherein said torque adjuster comprises a DC field adjuster to vary the DC electrical current of at least one of said first source of DC electrical current and said second source of DC electrical current to vary said torque.

4. The generator of claim 1, wherein said speed adjuster comprises a DC field adjuster to vary the DC electrical current of at least one of said first source of DC electrical current and said second source of DC electrical current to vary said rate of rotation of said second rotor.

5. The generator of claim 1, wherein said input shaft has an input shaft axis, said first rotor has a first rotor axis, and said second rotor has a second rotor axis, and where said input shaft axis, first rotor axis, and said second rotor axis are the same axis.

6. The generator of claim 1, wherein at least one of said speed controller, said torque controller, and said stator voltage controller comprises a programmable computer.

7. The generator of claim 1, wherein at least on of said speed controller, said torque controller, and said stator voltage controller comprises an analogue control circuit.

8. The generator of claim 1, further comprising at least one shaft bearing configured to support said input shaft and said first rotor and at least one second rotor bearing configured to support said second rotor.

9. The generator of claim 8, wherein said second rotor bearing is located circumferentially around said input shaft.

10. The generator of claim 1, wherein said speed controller is configured to compare said rotation rate of said second rotor received from said sensing sensor with a selected rotation rate, said speed controller generating said speed control signal to cause said speed adjuster to vary said DC electrical current to said first rotor and thereby urge said second rotor to rotate at said selected rotation rate.

11. The generator of claim 1, wherein said torque controller is configured to supply a control signal to said torque adjuster to vary said torque to maintain said AC power induced in said stator at substantially a selected frequency.

12. The generator of claim 1, wherein said stator voltage controller is configured to compare said stator voltage level signal against a voltage set-point, said stator voltage controller generating said stator voltage control signal to cause said stator voltage adjuster to vary said DC electrical current to said second rotor until said stator voltage matches said voltage set-point.

13. A generator for producing AC electrical power from a variable speed input, said generator comprising:

an input shaft which is rotatable at variable rotational rates;

a first rotor connected to said input shaft for rotation at variable rotation rates by said input shaft, said first rotor having a perimeter with a plurality of first rotor poles positioned thereabout, said rotor poles being configured to generate a magnetic field;

a second rotor having a plurality of second rotor poles configured to magnetically interact with the magnetic field of said first rotor to be urged to rotate in the same direction of rotation of said first rotor;

a stator placed concentrically around said second rotor, said stator having a plurality of windings positioned thereabout, said second rotor and said stator each being configured for the second rotor poles to induce an AC electrical power in said stator;

a first source of DC electrical power connected to said first rotor to supply a DC electrical current thereto;

a second source of DC electrical power connected to said second rotor to supply a DC electrical current thereto;

a speed sensor positioned and configured to sense the rotation rate of said second rotor, said speed sensor configured to supply a second rotor rate signal reflective of said rotation rate of said second rotor;

a speed adjuster connected to one of said first rotor, said second rotor and said first source of DC electrical power to vary said rotation rate of said second rotor;

a speed controller connected to said speed sensor to receive said second rotor rate signal and connected to said speed adjuster to supply a speed control signal to said speed adjuster to vary said rate of rotation of said second rotor;

a stator voltage sensor positioned and configured to sense said stator voltage, said stator voltage sensor configured to supply a stator voltage level signal reflective of said stator voltage;

a stator voltage adjuster connected to said second rotor and said source of DC electrical power to vary said stator voltage; and, a stator voltage controller connected to said stator voltage sensor to receive said stator voltage level signal and connected to said stator voltage adjuster to supply a stator voltage control signal thereto to vary said stator voltage.

14. The generator of claim 13, wherein said speed controller is configured to compare said rotation rate of said second rotor received from said sensing sensor with a selected rotation rate, said speed controller generating said speed control signal to cause said speed adjuster to vary said DC electrical current to said first rotor and thereby urge said second rotor to rotate at said selected rotation rate.

15. The generator of claim 13, wherein said stator voltage controller is configured to compare said stator voltage level signal against a voltage set-point, said stator voltage controller generating said stator voltage control signal to cause said stator voltage adjuster to vary said DC electrical current to said second rotor until said stator voltage matches said voltage set-point.

16. The generator of claim 13, further comprising:
- a torque sensor positioned and configured to sense a torque between said first rotor and said second rotor, said torque sensor configured to supply a torque level signal reflective of said torque between said first rotor and said second rotor;
- a torque adjuster connected to one of said first rotor, said second rotor and said first source of DC electrical power to vary said torque; and,
- a torque controller connected to said torque sensor to receive said torque level signal and connected to said torque varying means to supply a torque control signal to said torque adjuster to vary said torque.

17. A generator for producing AC electrical power from a variable speed input, said generator comprising:
- an input shaft which is rotatable at variable rotational rates;
- a first rotor connected to said input shaft for rotation at variable rotation rates by said input shaft, said first rotor having a perimeter with a plurality of first rotor poles positioned thereabout, said rotor poles being configured to generate a magnetic field;
- a second rotor having a plurality of second rotor poles configured to magnetically interact with the magnetic field of said first rotor to be urged to rotate in the same direction of rotation of said first rotor;
- a stator placed concentrically around said second rotor, said stator having a plurality of windings positioned thereabout, said second rotor and said stator each being configured for the second rotor poles to induce an AC electrical power in said stator;
- a first source of DC electrical power connected to said first rotor to supply a DC electrical current thereto;
- a second source of DC electrical power connected to said second rotor to supply a DC electrical current thereto;
- a torque sensor positioned and configured to sense a torque between said first rotor and said second rotor, said torque sensor configured to supply a torque level signal reflective of said torque between said first rotor and said second rotor;
- a torque adjuster connected to one of said first rotor, said second rotor and said first source of DC electrical power to vary said torque;
- a torque controller connected to said torque sensor to receive said torque level signal and connected to said torque varying means to supply a torque control signal to said torque adjuster to vary said torque;
- a stator voltage sensor positioned and configured to sense said stator voltage, said stator voltage sensor configured to supply a stator voltage level signal reflective of said stator voltage;
- a stator voltage adjuster connected to said second rotor and said source of DC electrical power to vary said stator voltage; and,
- a stator voltage controller connected to said stator voltage sensor to receive said stator voltage level signal and connected to said stator voltage adjuster to supply a stator voltage control signal thereto to vary said stator voltage.

18. The generator of claim 17, wherein said torque controller is configured to supply a control signal to said torque adjuster to vary said torque to maintain said AC power induced in said stator at substantially a selected frequency.

19. The generator of claim 17, wherein said stator voltage controller is configured to compare said stator voltage level signal against a voltage set-point, said stator voltage controller generating said stator voltage control signal to cause said stator voltage adjuster to vary said DC electrical current to said second rotor until said stator voltage matches said voltage set-point.

20. The generator of claim 17, further comprising:
- a speed sensor positioned and configured to sense the rotation rate of said second rotor, said speed sensor configured to supply a second rotor rate signal reflective of said rotation rate of said second rotor;
- a speed adjuster connected to one of said first rotor, said second rotor and said first source of DC electrical power to vary said rotation rate of said second rotor; and,
- a speed controller connected to said speed sensor to receive said second rotor rate signal and connected to said speed adjuster to supply a speed control signal to said speed adjuster to vary said rate of rotation of said second rotor.

* * * * *

UNITED STATES PATENT AND TRADEMARK OFFICE
CERTIFICATE OF CORRECTION

| | | |
|---|---|---|
| PATENT NO. | : 8,125,095 B2 | Page 1 of 1 |
| APPLICATION NO. | : 12/487643 | |
| DATED | : February 28, 2012 | |
| INVENTOR(S) | : Christopher K. Duffey and Leslie R. Smith | |

It is certified that error appears in the above-identified patent and that said Letters Patent is hereby corrected as shown below:

Col. 21, Line 22 of Claim 1 should recite --a stator voltage adjuster connected--

Col. 21, Line 50 of Claim 7 should recite --The generator of claim 1, wherein at least one of said--

Signed and Sealed this
Fifteenth Day of May, 2012

David J. Kappos
*Director of the United States Patent and Trademark Office*